United States Patent [19]

Deguchi et al.

[11] Patent Number: 5,233,389
[45] Date of Patent: Aug. 3, 1993

[54] DRIVING DEVICE FOR A DOCUMENT PLATEN AND COPYING MACHINE INCORPORATING A MOVABLE DOCUMENT PLATEN

[75] Inventors: Masanobu Deguchi, Kashiba; Yoshiaki Ibuchi; Mitsuru Ogura, both of Nara; Yoshifumi Maitani, Nara; Naoyuki Kamei, Yamatokoriyama, all of Japan

[73] Assignee: Sharp Kabushiki Kaisha, Osaka, Japan

[21] Appl. No.: 887,768

[22] Filed: May 22, 1992

[30] Foreign Application Priority Data

May 23, 1991 [JP] Japan .................. 3-118860

[51] Int. Cl.⁵ .......................... G03G 15/28
[52] U.S. Cl. ...................... 355/234; 74/29; 74/31; 355/233
[58] Field of Search ........... 355/234, 235, 50, 51, 355/75, 233, 316, 321; 74/29, 31, 33

[56] References Cited

U.S. PATENT DOCUMENTS

| | | | |
|---|---|---|---|
| 3,697,165 | 10/1972 | Morriston et al. | 355/50 X |
| 4,012,138 | 3/1977 | Washio et al. | 355/234 |
| 4,012,139 | 3/1977 | Washio et al. | 355/230 X |
| 4,181,424 | 1/1980 | Okada et al. | 355/234 |
| 4,297,023 | 10/1981 | Nagoshi | 355/75 X |
| 4,340,297 | 7/1982 | Tamura et al. | 355/50 |
| 4,792,824 | 12/1988 | Kozuka | 355/234 |

FOREIGN PATENT DOCUMENTS

| | | | |
|---|---|---|---|
| 2825389 | 12/1978 | Fed. Rep. of Germany | 355/234 |
| 56-22205 | 5/1981 | Japan . | |
| 56-122458 | 7/1981 | Japan . | |
| 0135926 | 7/1985 | Japan | 355/234 |
| 0018526 | 1/1987 | Japan | 355/234 |
| 4-67028 | 3/1992 | Japan . | |
| 1421920 | 9/1988 | U.S.S.R. | 74/31 |

Primary Examiner—A. T. Grimley
Assistant Examiner—Matthew S. Smith
Attorney, Agent, or Firm—David G. Conlin; George W. Neuner

[57] ABSTRACT

A document platen on which a document is placed is movably installed on the main body of a copying machine. A motor for producing a driving force is provided. An input gear to which the driving force is transmitted is located in a fixed position. A planetary gear is positioned such that it engages with and moves around the input gear. An endless gear is connected to the document platen. The endless gear has internal teeth in the form of a closed loop which engages with the planetary gear. When the planetary gear, which engages with both the input gear and the endless gear, moves around the input gear once, one reciprocating movement of the document platen is caused. With this configuration, since there is no need to provide a switching mechanism including clutches and solenoids that is used in a conventional device, the number of components is reduced, and thereby decreasing the manufacturing costs.

29 Claims, 19 Drawing Sheets

DRIVING DEVICE FOR A DOCUMENT PLATEN AND COPYING MACHINE INCORPORATING A MOVABLE DOCUMENT PLATEN

FIELD OF THE INVENTION

The present invention relates to a copying machine incorporating a movable document platen, and to a driving device for reciprocating the document platen of the copying machine in copying.

BACKGROUND OF THE INVENTION

As is commonly known, in a copying machine incorporating a movable document platen, the platen is moved forward and backward or in the F direction and in the R direction. When an optical system scans a document placed on the platen, the platen is moved in the F direction. Meanwhile, the platen is moved in the reverse (R) direction so that it is located in a scanning start position.

In such a copying machine, when scanning a document on the platen, the platen is firstly moved in the R direction from an original position where it is kept on standby to the scanning start position. Secondly, it is moved in the F direction to a scanning end position so as to scan the document. Then, it is moved in the R direction from the scanning end position to the original position.

In this type of a copying machine, for example, a driving device 151 for moving a document platen 152 in the above-mentioned manner is installed under the platen 152 as illustrated in FIG. 27. The driving device 151, for instance, incorporates a driving force transmitting device having gears, latches and solenoids shown in FIG. 28.

In the driving force transmitting device, when moving the platen 152 in the F direction from the scanning start position, a solenoid 153 used for moving the platen 152 in the F direction is actuated. This causes a latch 154 to engage with a clutch brake 156 of a spring clutch 155 for forward movement, whereby the spring clutch 155 is actuated. This allows a driving force passed to an input gear 157 to be transmitted via an output gear 158 to a platen driving gear 159. In consequence, when a rack of the platen 152 engages with the platen driving gear 159, platen 152 is moved in the F direction.

When the platen 152 reaches the scanning end position, a detection switch 160 shown in FIG. 27 detects the arrival of the platen 152 at the scanning end position. Then, the solenoid 153 is turned OFF, while a solenoid 161 used for moving the platen 152 in the R direction is actuated. This causes a latch 162 to engage with a clutch brake 163 of a spring clutch 167 for backward movement, whereby the spring clutch 167 is actuated.

As a result, the driving force passed to the input gear 157 is transmitted via a gear 164, input gear 165, and output gears 166 and 158 to the platen driving gear 159. And then, the platen 152 is moved in the R direction from the scanning end position to the original position. In the case of performing copying operations subsequently, the platen 152 is moved in the R direction to the scanning start position through the original position.

In such a copying machine incorporating a movable document platen, usually, there is not need to provide means for moving the optical system as the platen 152 is moved. Accordingly, it is possible to simplify the structure of the copying machine, and thereby resulting in a smaller copying machine. Thus, such a configuration is often adopted into inexpensive models.

However, with the above-mentioned conventional configuration, in order to achieve reciprocating movement of the platen 152, the spring clutch 155 and solenoid 153 for forward movement, and the spring clutch 167 and solenoid 161 for backward movement must be provided. In addition, in order to detect the arrival of the platen 152 at the scanning end position, the detection switch 160 is needed to be supplied.

Therefore, with this configuration, an increased number of components are necessary in order to reciprocate the platen 152. Consequently, the proportion of these components to the total cost becomes greater, causing an increase in the cost of manufacturing the copying machine.

SUMMARY OF THE INVENTION

One object of the invention is to provide a less expensive driving device for reciprocating a document platen by reducing the number of components of the driving device.

Another object is to provide a less expensive driving device comprising a reduced number of components, which reciprocates the document platen stably and thus produces copies of good quality.

A further object is to provide a driving device capable of reciprocating a document platen and protecting a driving section against overload.

Still another object is to provide a copying machine incorporating a reciprocating document platen, which is less expensive and comprises a reduced number of components.

In order to achieve one object, a driving device of this invention includes a document platen on which a document is placed, driving means for producing a driving force, an input gear to which the driving force is transmitted, an input gear that is located in a fixed position, a planetary gear which meshes with and moves around the input gear, and an endless gear in the form of a closed loop. The endless gear has two rack sections and two semicircular gear sections, wherein the pitch line of the internal teeth at one of the rack section and the pitch line of the internal teeth at the other rack section are parallel with each other and internal teeth are aligned in an arc at each of the semicircular sections, and the semicircular gear sections connect the ends of one of the rack sections with the ends of the other respectively. This endless gear is connected to the document platen, and the internal teeth thereof mesh with the planetary gear. Accordingly, a reciprocating movement of the document platen is caused by a movement of the planetary gear around the input gear through the endless gears.

With this configuration, when the driving means rotates the input gear at the time the planetary gear meshes with one of the rack sections, the planetary gear rotates in a direction opposite to the rotating direction of the input gear. This causes the endless gear to move in a straight line toward a direction corresponding to the rotating direction of the planetary gear. As a result, the document platen connected to the endless gear is moved in a straight line toward the same direction as the endless gear moves.

Subsequently, when the planetary gear meshes with one of the semicircular gear sections, it moves around the input gear about 180 degrees to mesh with the other rack section of the endless gear. Thus, the endless gear and the document platen are moved in a direction opposite to the above-mentioned direction.

Thus, with this configuration, the document platen is reciprocated, i.e., moved forward and backward in a straight line in a copying machine.

Meanwhile, with a prior art, switching means including clutches and solenoids is necessary in order to reciprocate a document platen.

However, with the configuration of the invention, it is possible to eliminate not only such switching means but also a control mechanism for the switching means.

Therefore, a simplified mechanism, a low incidence of failure, and easier maintenance are achieved. Additionally, since a reduced number of components are required, the manufacturing costs are decreased.

In order to achieve another object, the driving device of the present invention further comprises a connecting plate attached rotatably to the input gear and the planetary gear, and wherein the endless gear has a sliding surface formed around the outer circumference thereof and the connecting plate has a sliding section that slides over the sliding surface.

With this configuration, since the planetary gear stably engages with the endless gear and input gear due to the connecting plate, the endless gear can also move stably. As a result, the movement of the document platen connected to the endless gear is stabilized, and thereby contributing to copies of good quality.

In order to achieve the further object, the driving device of the present invention further includes a driving force transmitting mechanism for transmitting a driving force to the input gear. The driving force transmitting means incorporates an overload release mechanism to suspend the supply of the driving force to the input gear by using an overload preventing the movement of the document platen. This overload release mechanism comprises a first gear for receiving the driving force, a second gear for transmitting the driving force to the input gear, the first and second gears being disposed to face each other, a first intermeshing section mounted on the first gear, and a second intermeshing section which is mounted on the second gear such that it engages with the first intermeshing section and disengage therefrom by using the overload.

The incorporation of the overload release mechanism prevents the driving force transmitting mechanism, the endless gear and the planetary gear from getting damaged. Namely, when an overload preventing the movement of the document platen occurs during driving of the first gear, the second gear stops rotating. As a result, the first intermeshing section and the second intermeshing section disengage from each other. This makes the first gear rotatable even when the second gear stops rotating, and therefore the transmission of the driving force to the second gear and endless gear is cut off. Thus, it is possible to prevent the driving force transmitting mechanism, the planetary gear, and the endless gear from being damaged.

In order to achieve still another object, a copying machine according to the present invention incorporates a movable document platen on which a document is placed, a driving device for reciprocating the document platen, transport means for transporting copy paper according to the movement of the document platen, and driving means for driving both of the driving device and the transport means. The transport distance of the copy paper is set according to the travel distance of the document platen such that the transport means feeds the copy paper having a copied image thereon out of the machine before the document platen which has finished a movement for scanning the document returns to the original position. The driving device for the document platen includes driving means for producing a driving force, and an input gear which is located in a fixed position and to which the driving force is transmitted, a planetary gear which engages with and moves around the input gear, and an endless gear in the form of a closed loop. The endless gear is connected to the document platen and has internal teeth which engage with the planetary gear. Therefore, a reciprocating movement of the document platen is caused by a movement of the planetary gear around the input gear through the endless gear.

With this configuration, as described above, since the document platen is reciprocated without switching means for reciprocating the document platen, a reduced number of components, a low incidence of failure, and simplified management and control are achieved. Consequently, the manufacturing costs are decreased.

For a fuller understanding of the nature and advantages of the invention, reference should be made to the ensuing detailed description taken in conjunction with the accompanying drawings.

DESCRIPTION OF THE EMBODIMENTS

Figure 4:
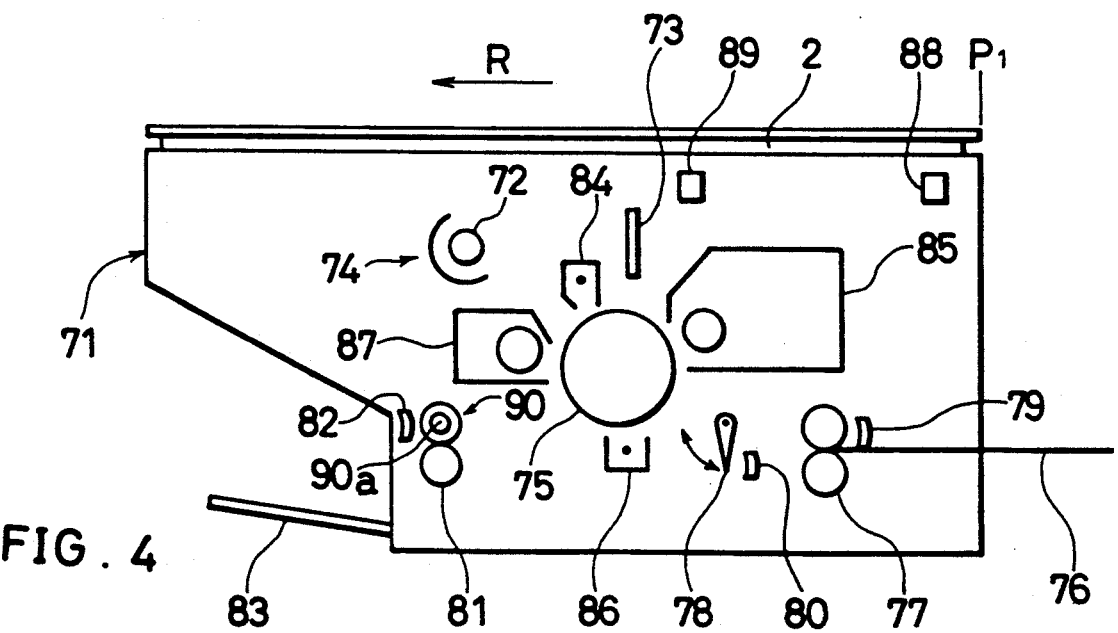
FIG. 4 is a view schematically illustrating the structure of a copying machine incorporating the driving device, wherein a document platen is at an original position.

A copying machine incorporating a movable document platen (hereinafter referred to as the copying machine) according to this embodiment is capable of making a copy of an image on paper of a maximum size of A4 when the A-4 sized paper is fed lengthways. As illustrated in FIG. 4, the copying machine is constituted by a main body 71 and a document platen 2 disposed above the main body 71. The platen 2 is driven forward (in the F direction) and backward (in the R direction) in a straight line by a driving device 101 for the platen 2, as will be described later. The F direction is a direction of scanning a document and the R direction is the reverse direction.

Installed inside the main body 71 is an optical system 74, including a light source 72 and a SELFOC lens 73, for scanning a document placed on the platen 2. The light source 72 and SELFOC lens 73 are located at upper parts of the main body 71. The light source 72 illuminates light on the document on the platen 2, and the SELFOC lens 73 focuses reflected light from the document on a photoreceptor 75 to be described later. The SELFOC lens 73 is made from an array of optical fibers whose refractive index varies radialy and therefore produces light converging effect.

Figure 5:
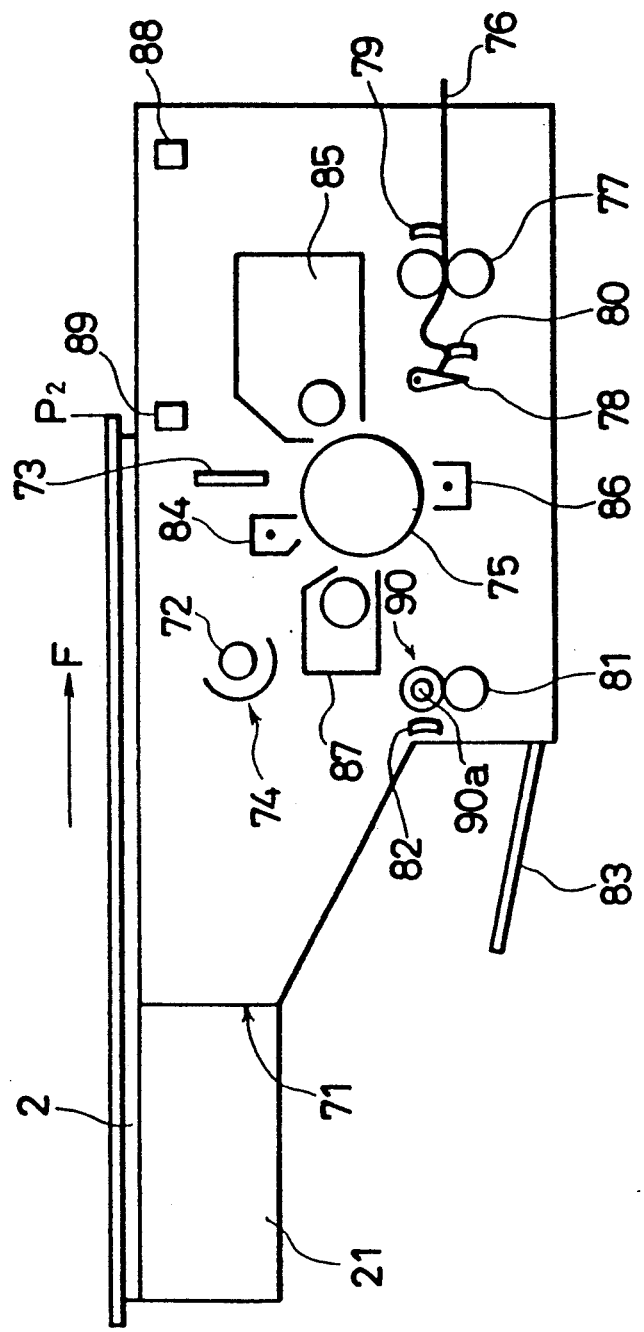
FIG. 5 is a view schematically illustrating the structure of the copying machine, wherein the document platen is at a scanning start position.

Two detection switches 88 and 89 are installed at a predetermined interval by the side of the optical system 74. The detection switch 88 detects the arrival of the platen 2 at an original position $P_1$, to be described later, while the detection switch 89 detects the arrival of the platen 2 at a scanning start position $P_2$ as shown in FIG. 5.

The photoreceptor 75 in the shape of a drum is disposed under the optical system 74, and exposed to light from the optical system 74 so as to form an electrostatic latent image on the photoreceptor 75. Aligned around the circumference of the photoreceptor 75 are a main charger 84, a development device 85, a transfer charger 86 and a cleaning device 87.

The main charger 84 charges the photoreceptor 75, and the development device 85 develops the electrostatic latent image so as to form a toner image on the photoreceptor 75. The transfer charger 86 transfers the toner image onto copy paper 76. And, the cleaning device 87 removes any toner remaining on the surface of the photoreceptor 75.

Installed between a position from which the copy paper 76 is supplied and the photoreceptor 75 are transport rollers 77 and a gate 78. The transport rollers 77 convey the copy paper 76, and the gate 78 opens and closes the transport path of the copy paper 76. Disposed in the vicinity of the transport rollers 77 and of the gate 78 are detection switches 79 and 80 for detecting the conveyed copy paper 76, respectively.

In addition, a fixing roller 81 and a heating roller 90 incorporating a heating lamp 90a inside thereof are provided ahead of the photoreceptor 75 along the transport direction of the copy paper 76. The fixing roller 81 and heating roller 90 are disposed such that the copy paper 76 are nipped between them.

Therefore, when the fixing roller 81 and heating roller 90 with the copy paper 76 nipped therebetween rotate, the copy paper 76 is fed onto a tray 83 for discharged paper while the above-mentioned toner image is fixed to the copy paper 76 through heat. Provided in the vicinity of the fixing roller 81 is a detection switch 82 for detecting the discharge of the copy paper 76.

It is defined in this copying machine that, when the platen 2 is at the original position $P_1$, its leading edge aligns with an edge of the main body 71 toward the F direction. In a copying operation, the platen 2 is firstly moved in the R direction from the original position $P_1$ shown in FIG. 4 to a scanning start position $P_2$ shown in FIG. 5.

Figure 6:
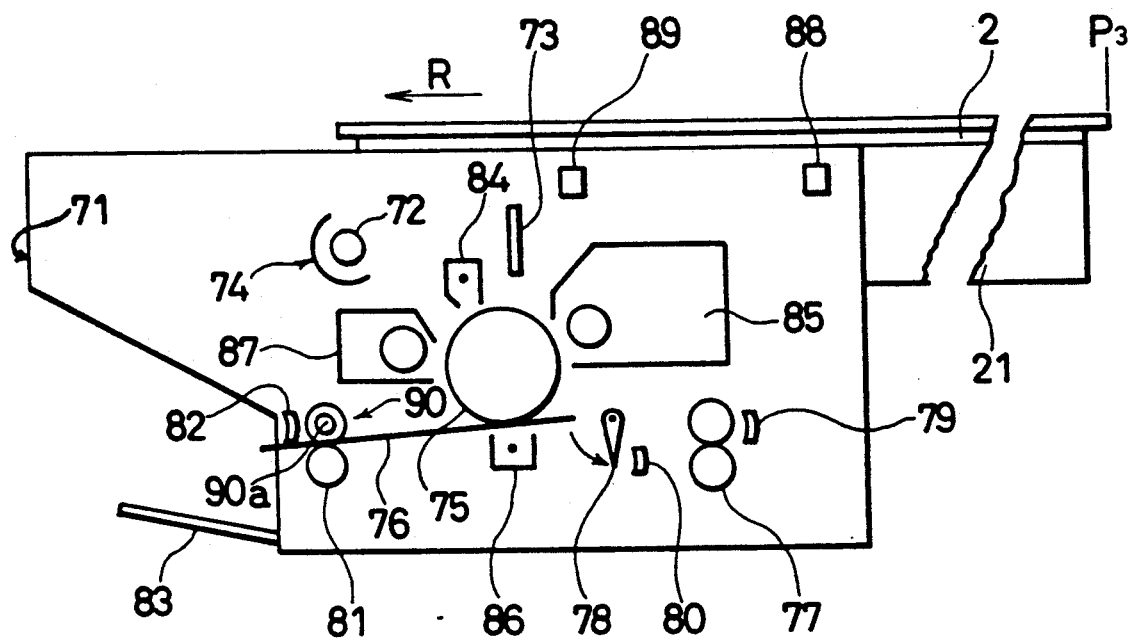
FIG. 6 is a view schematically illustrating the structure of the copying machine, wherein the document platen is at a scanning end position.

Next, the platen 2 is moved forward, i.e., in the F direction to a scanning end position $P_3$ shown in FIG. 6 so that the document is scanned by the optical system 74. Finally, the platen 2 is moved in the R direction back to the original position $P_1$ shown in FIG. 4 via a state illustrated in FIG. 7.

Figure 1:
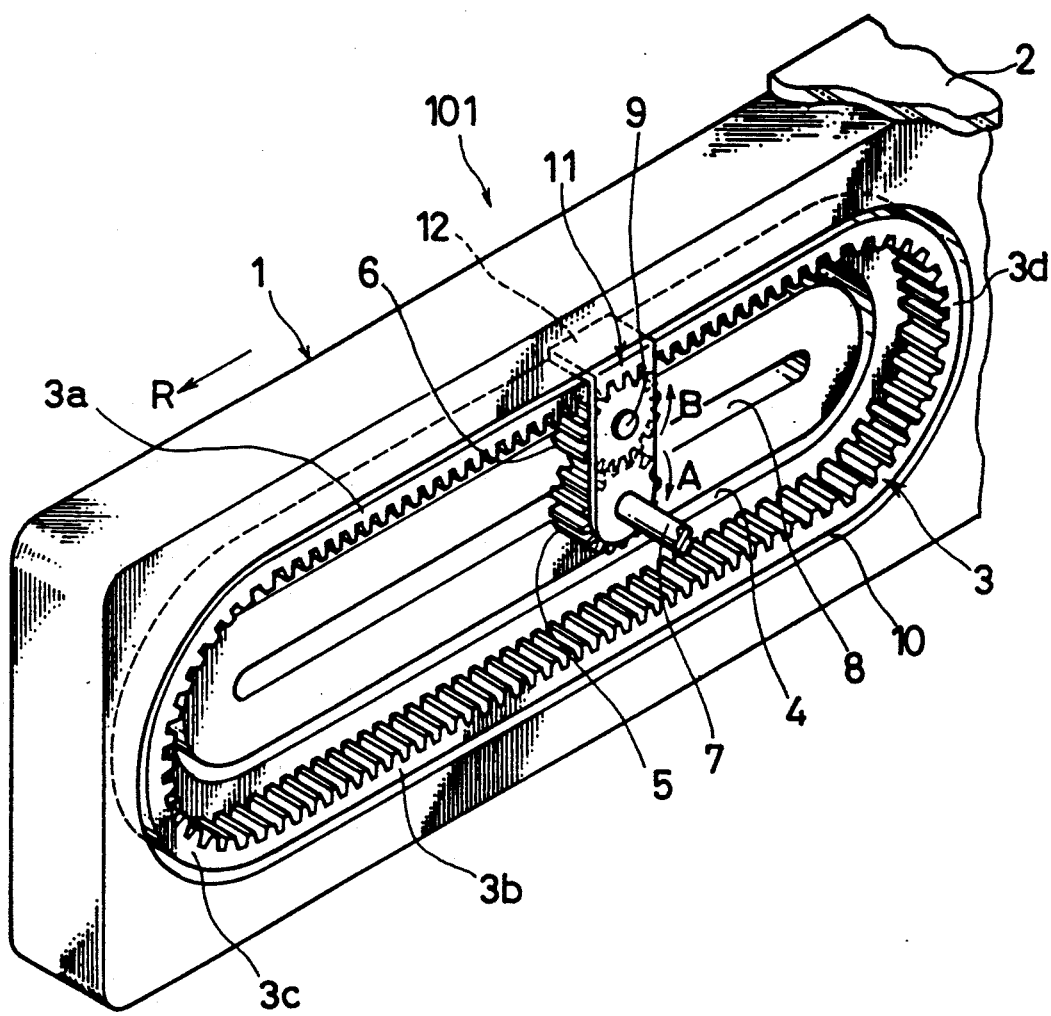
FIG. 1 is a perspective view illustrating essential parts of a driving device for a document platen of the present invention.
Figure 11:
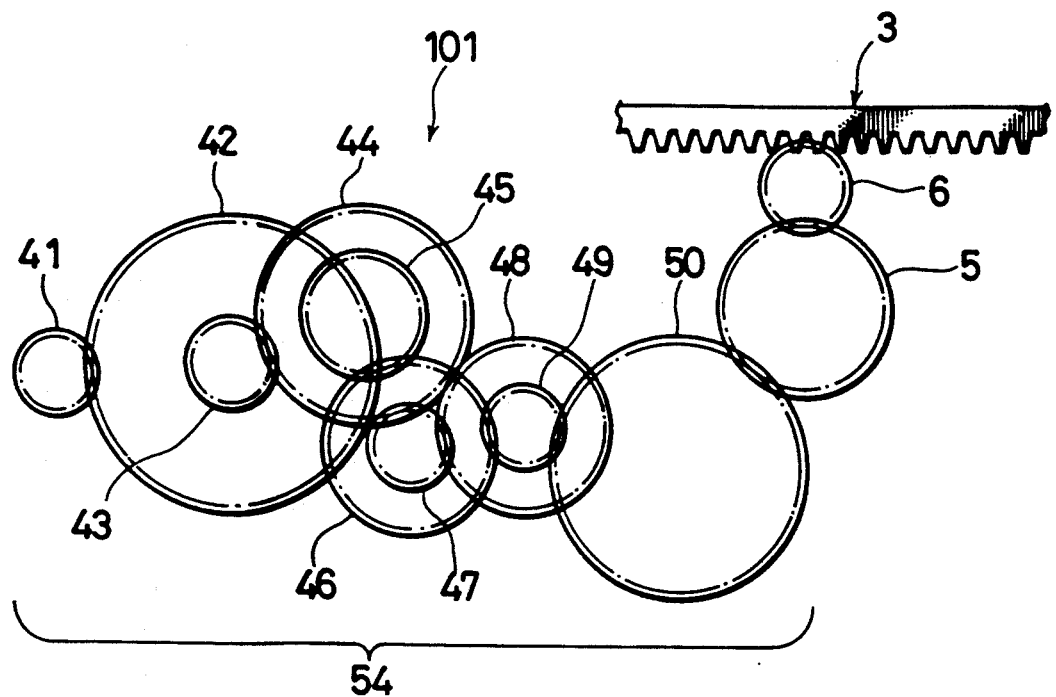
FIG. 11 is an explanatory view schematically illustrating a driving force transmitting mechanism in the driving device.
Figure 12:
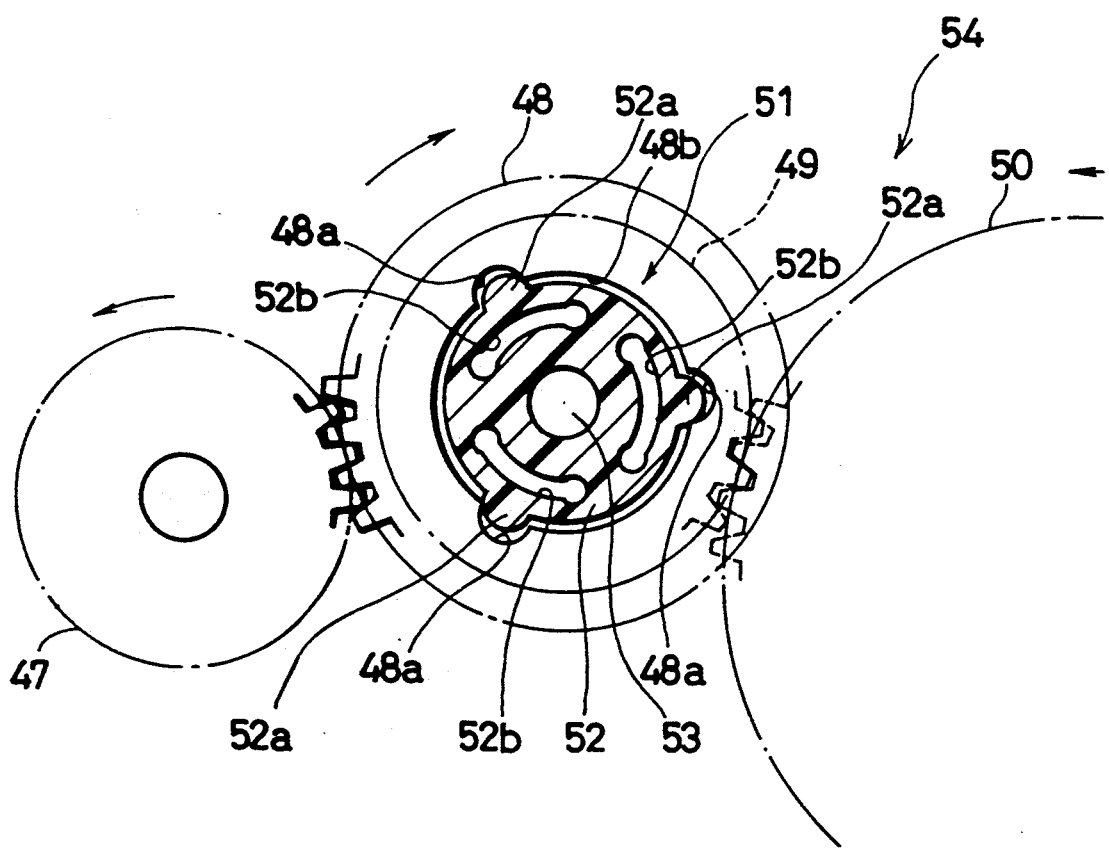
FIG. 12 is a front elevation in vertical section schematically illustrating an overload release mechanism in the driving force transmitting mechanism.
Figure 13:
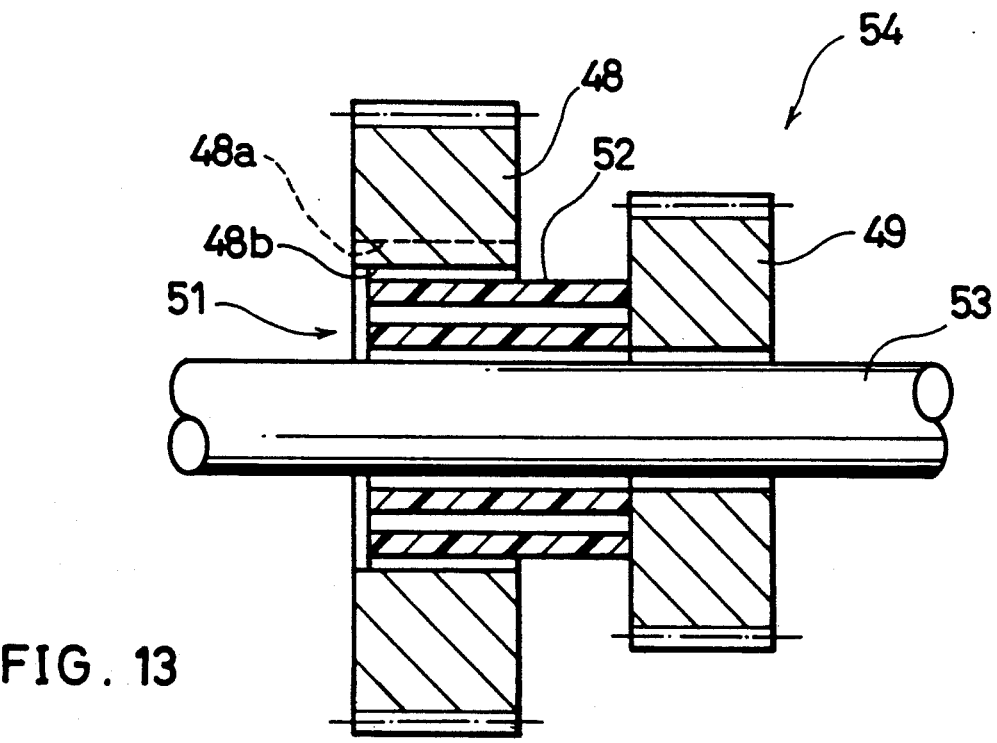
FIG. 13 is a side elevation in vertical section illustrating the overload release mechanism.

In order to drive the platen 2 in the above-mentioned manner, as illustrated in FIGS. 11 through 13, the copying machine of the present invention has a driving force transmitting mechanism 54 and a driving device 101 for the platen 2. As shown in FIG. 1, the driving device 101 includes an input gear 5, a planetary gear 6, a connecting plate 11, an endless gear 3 and a main carrier 1.

The main carrier 1 is formed in the shape of a longitudinal wall. And, it is vertically suspended from an edge of the platen 2 such that the main carrier 1 and the platen 2 are moved together along the back side of the main body 71.

An ellipse-shaped depression is formed in the center of the main carrier 1. The circular endless gear 3 having inner teeth is installed in the depression such that there is a gap 10 for guiding the connecting plate 11 between the outer surface of the endless gear 3 and the main carrier 1.

The endless gear 3 is formed by a pair of an upper rack section 3a and a lower rack section 3b and a pair of a left semicircular gear section 3c and a right semicircular gear section 3d. The pitch line of the internal teeth at the rack section 3a and the pitch line of the internal teeth at the rack section 3b are parallel with each other.

The inner teeth at each of the left and right semicircular gear sections 3c and 3d are aligned in a semicircle. The pitch circle of the semicircular gear section 3c and the pitch circle of the semicircular gear 3d are respectively connected to the pitch lines in line with each other. The bent section 12 of the connecting plate 11, to be described later, slides over the outer surface of the endless gear 3.

The above-mentioned input gear 5 is located at a position midway between the upper and lower rack sections 3a and 3b, and is attached to an input shaft 7 to which a driving force is transmitted.

The above-mentioned planetary gear 6 is attached to a gear shaft 9 so as to mesh with both of the input gear 5 and the endless gear 3. The input shaft 7 is rotatably supported at an end of the connecting plate 11, while the gear shaft 9 is rotatably supported at a center portion thereof.

Moreover, there is the bent section 12 at other end of the connecting plate 11. The bent section 12 is formed by bending the connecting plate 11 at right angles so that is is inserted into the gap 10 and slides over the outer surface of the endless gear 3.

Since the connecting plate 11 maintains the planetary gear 6 and the input gear 5 and endless gear 3 in mesh, the bent section 12 slides over the outer surface of the endless gear 3.

An input-shaft guiding groove 8 is formed parallel with the upper and lower rack sections 3a and 3b on the main carrier 1. In addition, a gear-shaft guiding groove 4 for guiding the gear shaft 9 is formed along the inner periphery of the endless gear 3 between the input-gear guiding groove 8 and the endless gear 3 on the main carrier 1.

As illustrated in FIG. 11, the main body 71 shown in FIG. 4 has the driving force transmitting mechanism 54 for transmitting the driving force of a main motor (not shown) to the input gear 5. Accordingly, the input shaft 7 is fixed at a predetermined position.

The driving force transmitting mechanism 54 includes a motor gear 41 and gears 42 to 50. As for the gears 42 to 50, for example, as illustrated in FIGS. 12 and 13, an overload release mechanism 51 is provided between the gears 48 and 49 which are supported by the gear shaft 53 and rotate integrally.

The overload release mechanism 51 includes a connector 52 which is substantially cylindrical in shape and axially attached to a face of gear 49. The gear 48 has an inner surface 48b which fits the connector 52. A plurality of recessed joint sections 48a are formed substantially at regular intervals on the inner surface 48b.

A plurality of joint sections 52a protruding in a radial direction are formed on the outer surface of the connector 52 so that they can fit into the recessed joint sections 48a. The connector 52 is made from an elastic synthetic resin, and has voids 52b between the protruding joint sections 52a and the axis. The voids 52b extend in the axis direction of the connector 52 and have hollow profiles elongating in a circumferential direction.

Figure 8:
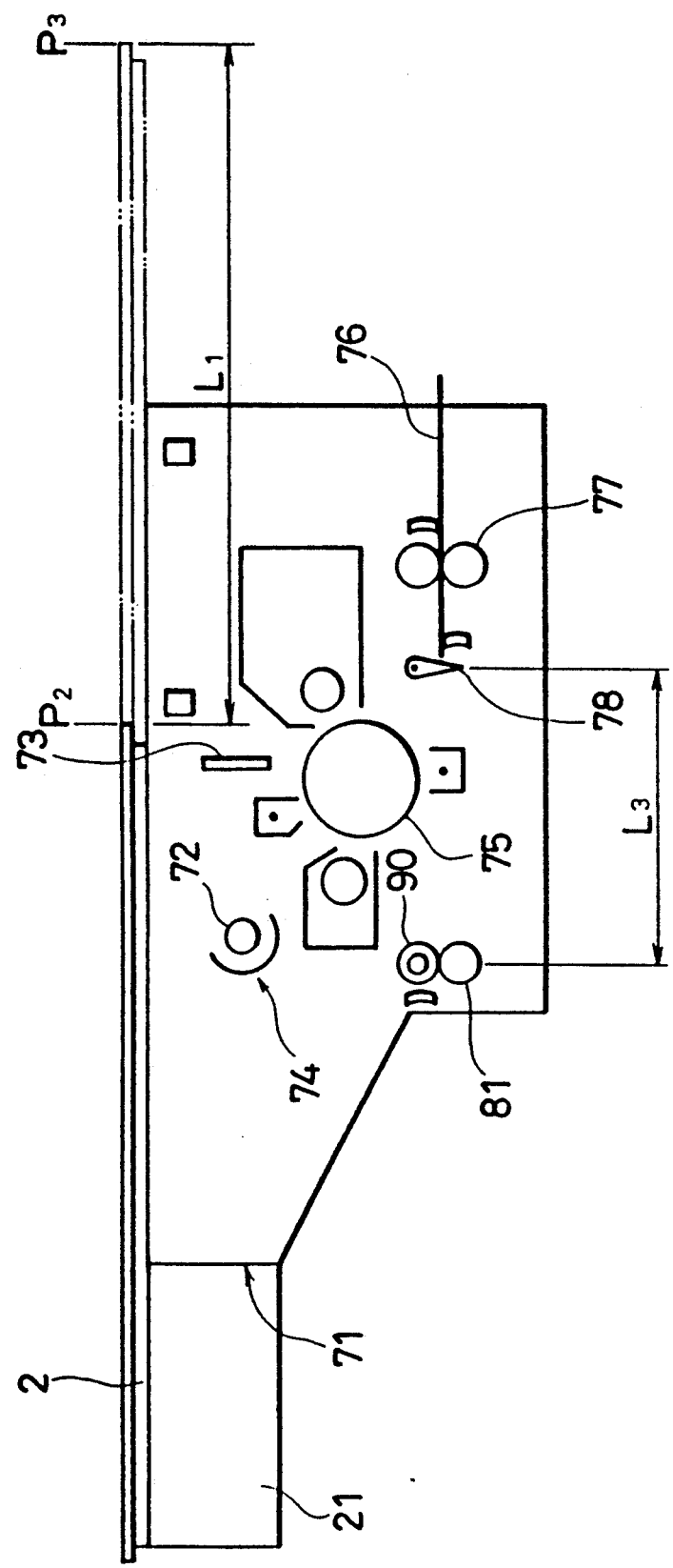
FIG. 8 is an explanatory view illustrating a travel distance of the document platen from the scanning start position to the scanning end position in the copying machine, and a transport distance of copy paper in copying.
Figure 9:
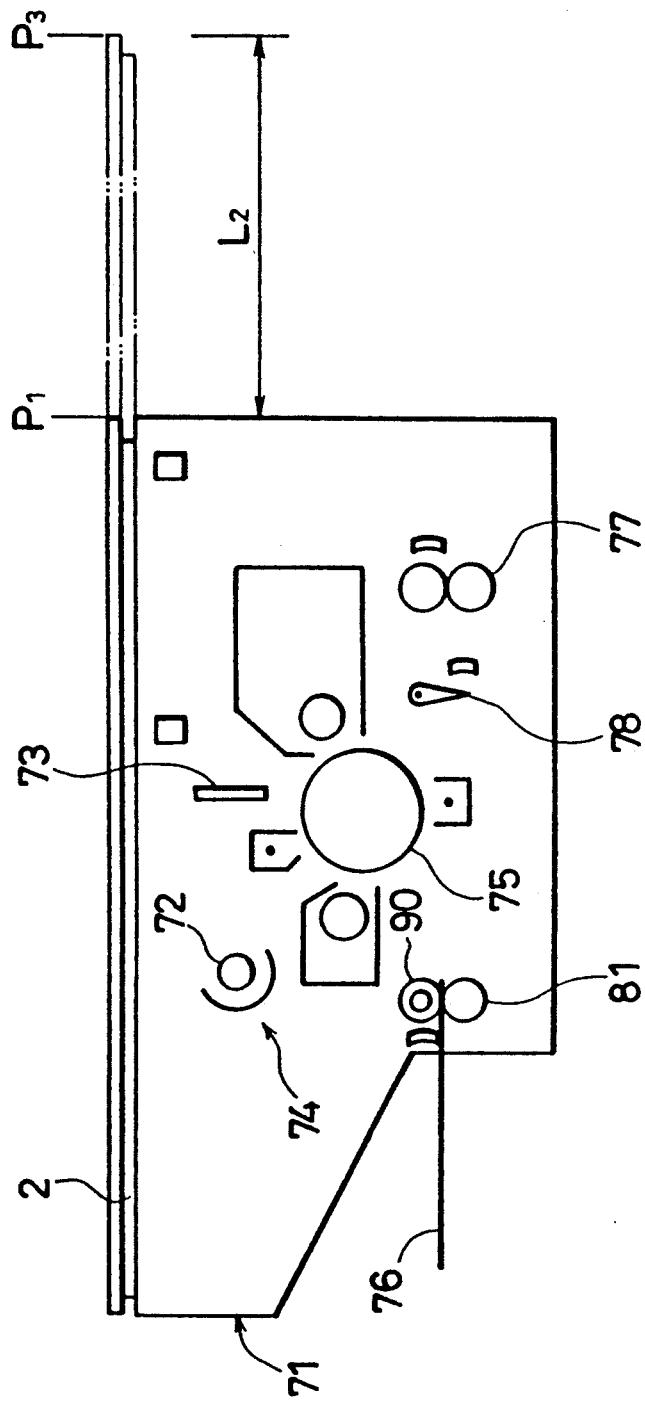
FIG. 9 is an explanatory view illustrating a travel distance of the document platen from the scanning end position to the original position in the copying machine.

With the configuration of this embodiment, as illustrated in FIGS. 8 and 9, the motion of the platen 2 is controlled by switching the main motor (not shown) ON or OFF. Therefore, in a single copying operation during which the platen 2 is moved from the original position $P_1$ and moved back thereto, the copy paper 76 having thereon an image copied from the original document passes between the heating roller 90 and fixing roller 81 and is discharged from the main body 71.

Namely, in this copying machine, in order to stabilize the quality of copies by synchronizing a speed of scanning a document on the platen 2 with a speed of transferring an image onto the copy paper 76, the moving speed of the platen 2 in the F direction and the transport speed of the copy paper 76 are set to be equal.

Meanwhile, the travel distance of the platen 2 in a single copying operation is given by adding up a travel distance $L_1$ from the scanning start position $P_2$ to the scanning end position $P_3$ indicated in FIG. 8 and a travel distance $L_2$ from the scanning end position $P_3$ to the original position $P_1$ shown in FIG. 9. The travel distance of the copy paper 76 in a single copying operation is calculated by adding up a travel distance $L_3$ of the copy paper 76 from a gate 78 to the fixing roller 81 shown in FIG. 8 and a length $L_4$ of the copy paper 76 in the feeding direction.

For example, in the case when A4-sized paper having a length of 297 mm is used as the copy paper 76 and fed lengthways, the travel distance of the platen 2 and the travel distance of the copy paper 76 are set so as to meet the following condition.

$$L_1+L_2>L_3+L_4$$

Then, $L_3$ is set so as to satisfy the following condition.

$$L_1+L_2-L_4>L_3$$

With this configuration, the copy paper 76 having thereon an image copied from the original document is discharged in a single copying operation, i.e., in a period when the platen 2 is moved from the original position $P_1$ and moved back thereto.

However, if the copy paper 76 having thereon the copied image can not be discharged within a single copying operation, the platen 2 needs to wait at the original position $P_1$. This is due to the fact that, during the driving of means for transporting the copy paper 76, such as the heating roller 90 and fixing roller 81, the platen 2 returns to the original position $P_1$.

Figure 2:
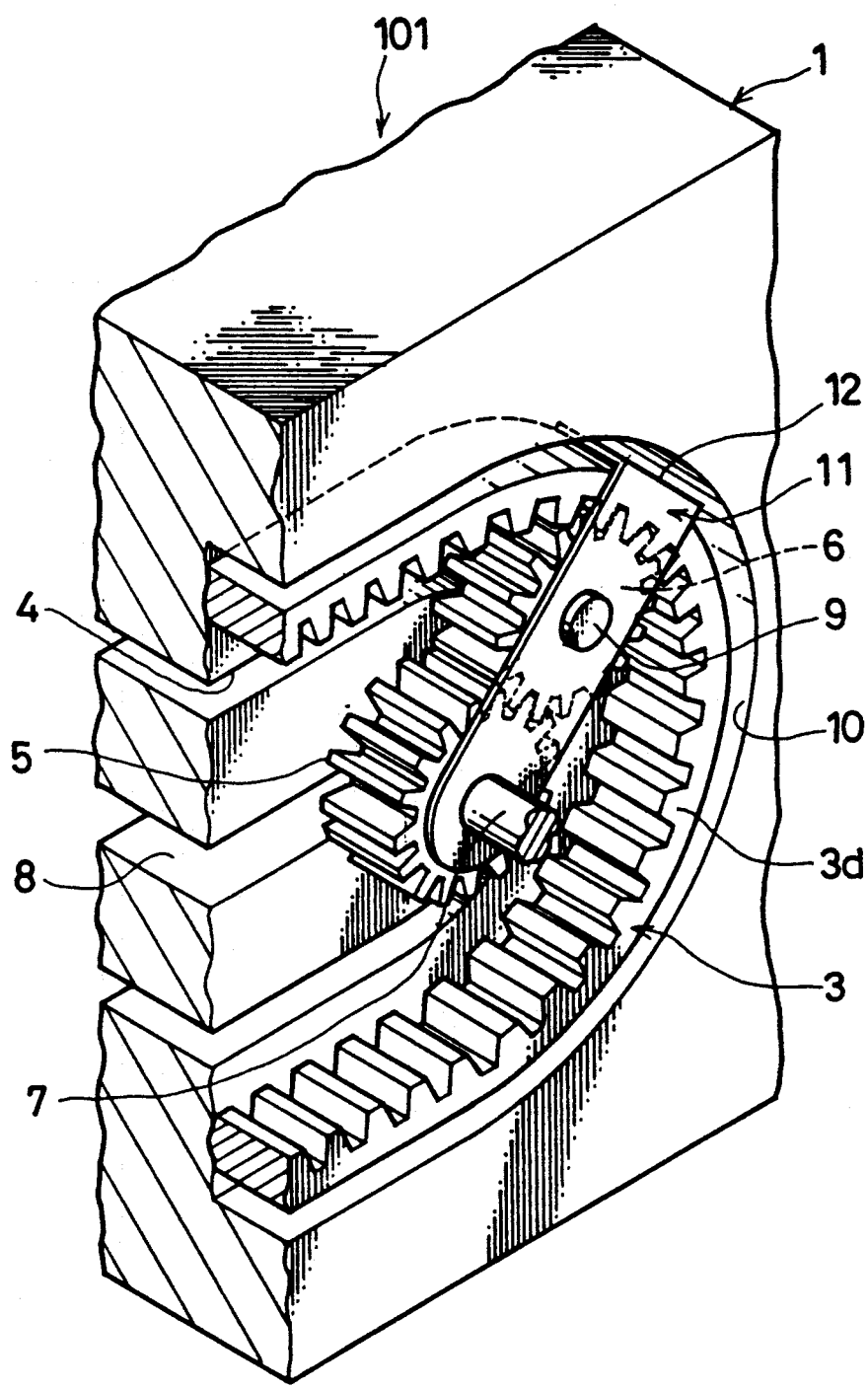
FIG. 2 is a perspective view illustrating the driving device of FIG. 1, wherein a planetary gear and a right semicircular gear section of an endless gear are in mesh.
Figure 3:
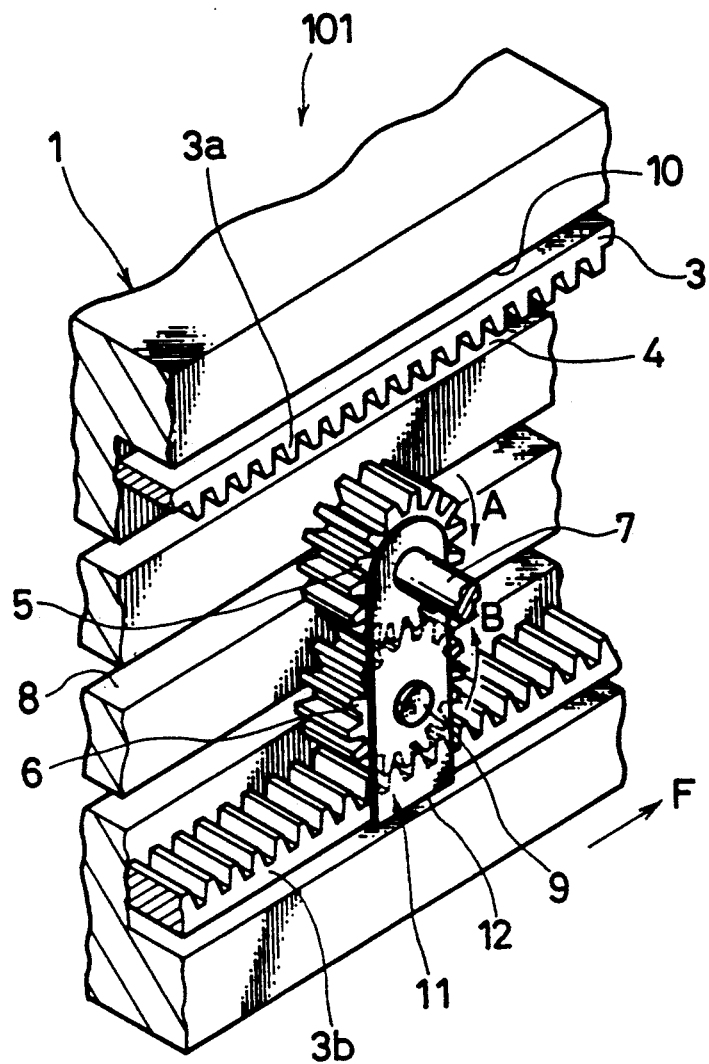
FIG. 3 is a perspective view illustrating the driving device of FIG. 1, wherein the planetary gear and a lower rack section of the endless gear are in mesh.

In this case, therefore there is a need to suspend the transmission of the driving force to the driving device 101 shown in FIGS. 1 through 3 when driving the transporting means. Thus, a clutch for transmitting the driving force to the driving device 101 and cutting off the transmission is necessary.

Figure 10:
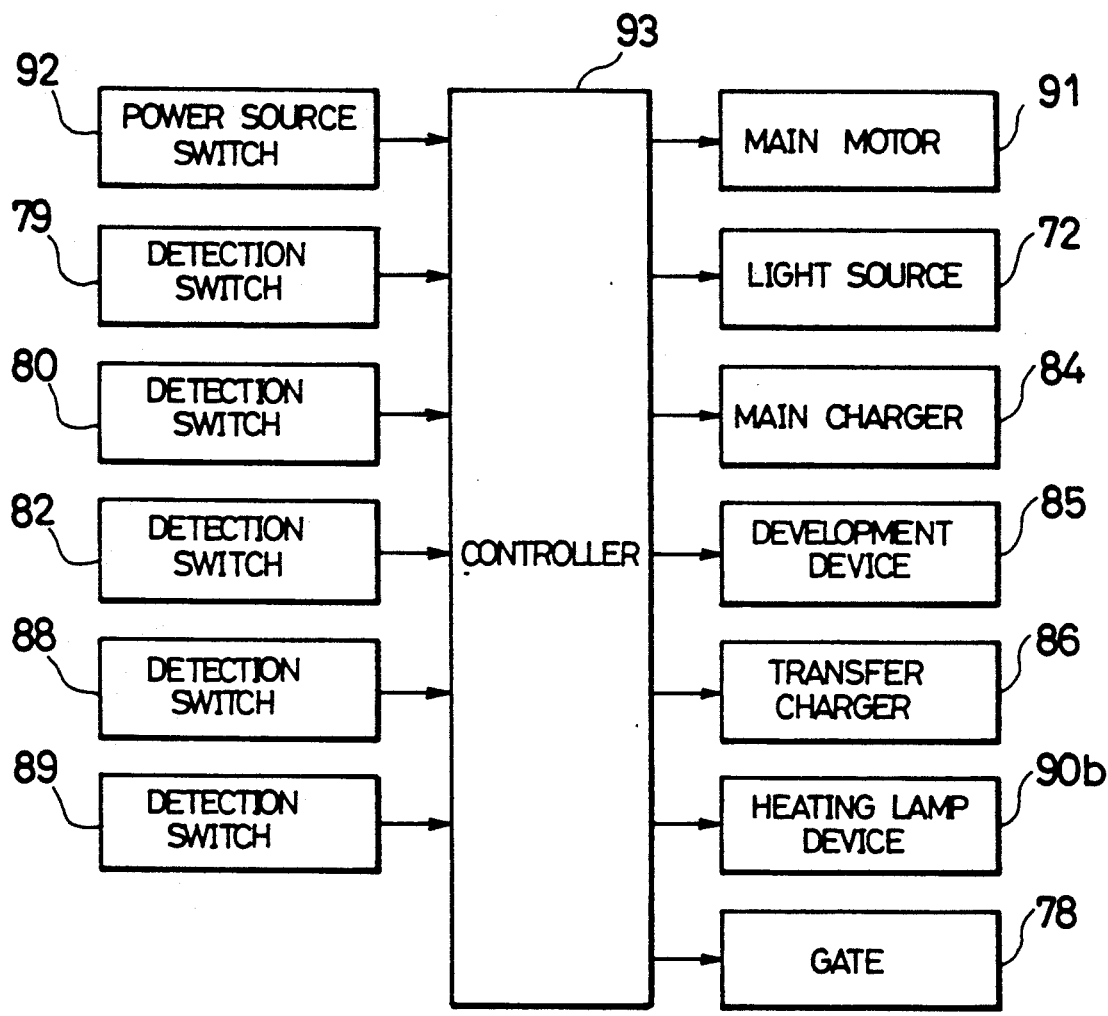
FIG. 10 is a block diagram schematically illustrating the structure of a control system in the copying machine.

However, with the configuration of the above-mentioned embodiment, it is possible to eliminate a clutch for transmitting the driving force of the main motor 91 shown in FIG. 10 to the driving device 101.

Further, as illustrated in FIG. 10, a controller 93 is provided so that the main motor 91, light source 72, main charger 84, development device 85, transfer charger 86, heating lamp device 90b and gate 78 are controlled by switching the switch 92 of power source, the detection switches 79, 80, 82, 88 and 89 ON or OFF. The heating lamp device 90b is constituted by the heating roller 90, fixing roller 81 and a heating lamp 90a.

Based on this configuration, the following will describe a copying operation of the copying machine.

In copying, as shown in FIG. 4 through FIG. 7, a document on the platen 2 is scanned by the optical system 74, while the photoreceptor 75 is charged to a predetermined potential by the main charger 84. More specifically, the document is illuminated by the light source 72 in a period when the platen 2 is moved from the scanning start position $P_2$ shown in FIG. 5 to the scanning end position $P_3$ shown in FIG. 6. Light reflected from the document falls onto the photoreceptor 75 via a SELFOC lens 73.

As a result, the photoreceptor 75 is exposed, and then a static latent image corresponding to the image on the document is formed thereon. The static latent image is developed into a toner image by the development device 85. The transfer charger 86 transfers the toner image to the copy paper 76 supplied form the paper feeding section. Subsequently, the toner image transferred to the copy paper 76 is fixed to the copy paper 76 by heat through the fixing roller 81 and the heating roller 90. The copy paper 76 is then discharged onto the tray 83 for discharged paper.

Next, the operation of the driving device 101 shown in FIG. 1 will be explained below.

As illustrated in FIG. 1, when the input gear 5 rotates clockwise or in the A direction at the time the planetary gear 6 and the upper rack section 3a are in mesh, the planetary gear 6 rotates in the B direction. This causes the endless gear 3 to move in the R direction because the input shaft 7 is located in a fixed position. As a result, the platen 2 is moved in the R direction.

When the right semicircular gear section 3d of the endless gear 3 reaches the planetary gear 6, the planetary gear 6 moves around the input shaft 7 and toward the lower rack section 3b as illustrated in FIG. 2. At this time, the endless gear 3 is not moving.

When the input gear 5 further rotates in the A direction, the planetary gear 6 engages with the lower rack section 3b as illustrated in FIG. 3. Then, the endless gear 3 moves in the F direction. This causes the platen 2 shown in FIG. 1 to be moved in the F direction.

Therefore, the lengths of the upper and lower rack sections 3a and 3b and the position of the input gear 5 are set according to the scanning start position $P_2$ and the scanning end position $P_3$ of the platen 2. Consequently, the platen 2 is moved in the R direction and the F direction alternately by rotating the input gear 5 in a predetermined direction.

Even if the detection means for detecting the arrival of the platen 2 at the scanning start position $P_2$ and at the scanning end position $P_3$ are excluded, it is possible to reciprocate the platen 2 in the range between the scanning start position $P_2$ and the scanning end position $P_3$.

Figure 15:
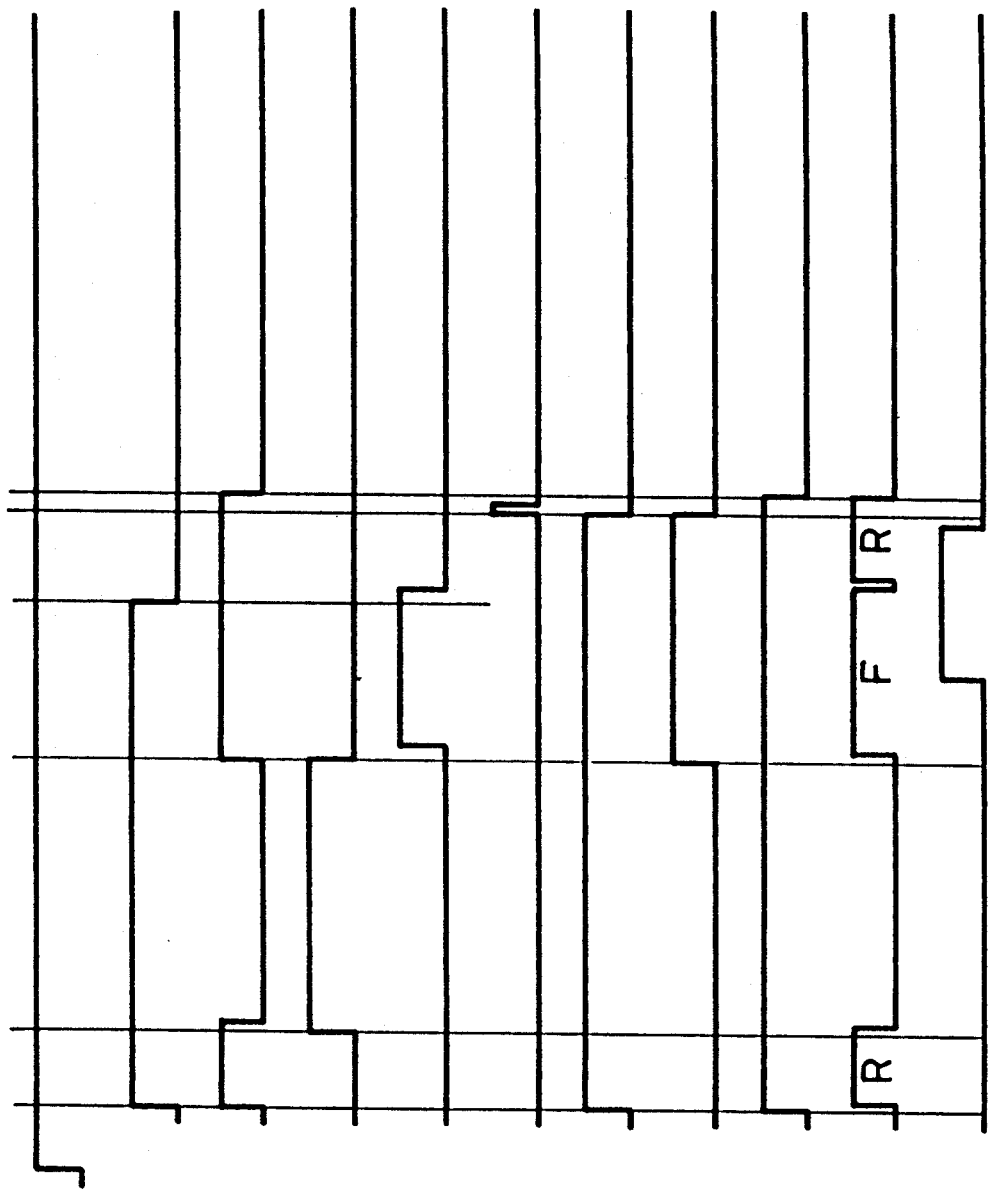
FIG. 15 is a timing chart illustrating the timing of the operations of the respective means in the copying machine.

Next, the operation of the copying machine controlled by a controller 93 shown in FIG. 10 will be explained with reference to FIGS. 4 through 7 and the timing chart of FIG. 15.

When an operator turns the switch 92 of power source ON (see FIG. 15(a)), the copy paper 76 is fed from the feeding section as shown in FIG. 4. Then, when the copy paper 76 reaches the transport rollers 77, the detection switch 79 is turned ON (see FIG. 15(b)).

When the detection switch 79 is turned ON, the controller 93 controls the main motor to be actuated (see FIG. 15(c)), whereby the platen 2 is moved from the original position $P_1$ toward the scanning start position $P_2$ (see FIG. 15(j)). When the copy paper 76 is conveyed by the transport rollers 77 to a position where its edge comes into contact with the gate 78, the detection switch 80 detects this state. At this time, the heating lamp 90a is switched ON (see FIG. 15(g)) to heat the heating roller 90, while the light source 72 is switched ON to eliminate electrostatic from the surface of the photoreceptor 75 (see FIG. 15(i)).

Then, as illustrated in FIG. 5, when the platen 2 reaches the scanning start position $P_2$ (see FIG. 15(j)), the detection switch 89 is turned ON (see FIG. 15(d)). This causes the main motor 91 to be stopped (see FIG. 15(c)), whereby the platen 2 is kept on standby at the scanning start position $P_2$ (see FIG. 15(j)).

Next, when the heating roller 90 reaches a predetermined temperature, the main motor 91 is actuated (see FIG. 15(c)) to start the above-mentioned copying operation. At this time, the main charger 84 is actuated (see FIG. 15(h)) so as to charge the photoreceptor 75 to a predetermined electric potential, and the platen 2 is moved in the F direction (see FIG. 15(j)) so that the document is scanned by the light source 72. Furthermore, since the gate 78 opens the transport path (see FIG. 15(e)), the copy paper 76 is fed toward the photoreceptor 75. After the copy paper 76 passes through the transport rollers 77, the detection switch 79 is turned OFF (see FIG. 15(b)), and the gate 78 closes the transport path a little later (see FIG. 15(e)).

Figure 7:
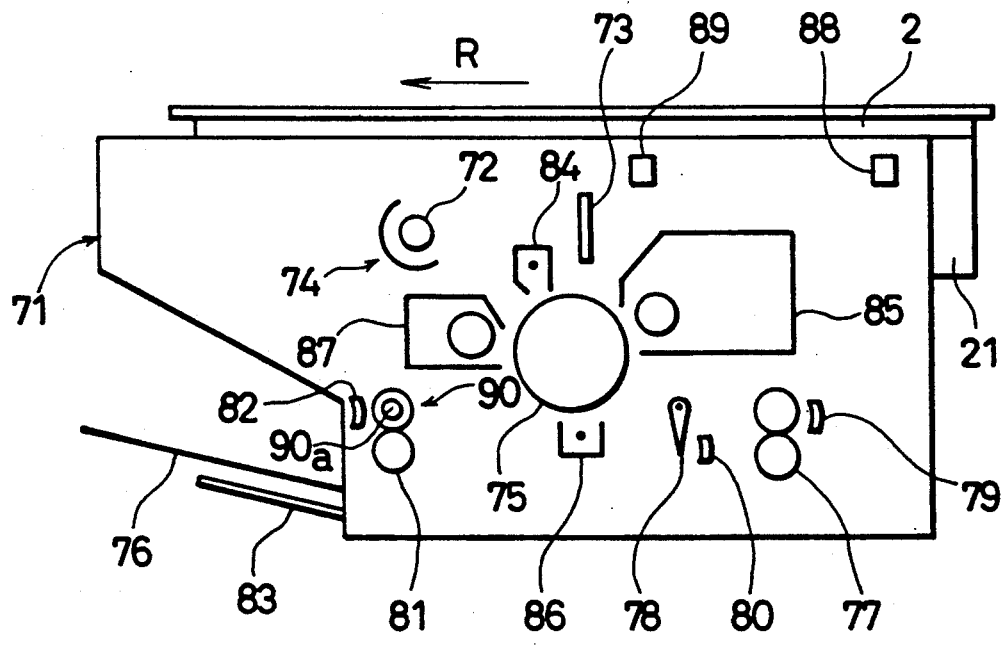
FIG. 7 is a view schematically illustrating the structure of the copying machine, wherein the document platen is being moved from the scanning end position toward the original position.

When the platen 2 reaches the scanning end position $P_3$ as shown in FIG. 6, the platen 2 is stopped temporarily until the planetary gear 6 passes through the left semicircular gear section 3c and then further moved in the R direction (see FIG. 15(j)) due to the structure of the endless gear 3 shown in FIG. 1. As illustrated in FIG. 7, before the platen 2 reaches the original position $P_1$, the copy paper 76 passes through the heating roller 90 and is discharged onto the tray 83. This state is detected by the discharge detection switch 82 (see FIG. 15(k)).

When the platen 2 reaches the original position $P_1$ after the copy paper 76 is discharged onto the tray 83, the detection switch 88 is turned ON (see FIG. 15(j) and (f)). This signal triggers the main motor 91, heating lamp 90a, light source 72 and main charger 84 to be turned OFF. Accordingly, the platen 2 is stopped and come into a standby state.

In a conventional driving device for a document platen, a set of large numbers of intricate members such as gears, clutches and solenoids is used in order to reciprocate the platen 2. Since this structure makes the control of the respective members complicated, failures tend to occur in the members. In addition, a large number of members cause an increase in the manufacturing costs.

On the contrary, with the structure of this embodiment, even if switching means including solenoids and clutches is not provided, the platen 2 can still be reciprocated. Thus it is possible to simplify the driving device, and to make the control easier. As a result, the incidence of failure can be decreased considerably. Moreover, since the number of members is reduced, the manufacturing costs are decreased.

The following will describe the operation of the overload release mechanism 51.

For example, when an external force is not applied to the platen 2, since the protruding joint sections 52a fit into the corresponding recessed joint sections 48a as illustrated in FIG. 12, the driving force of the main motor 91 passed from the motor gear 41 of FIG. 11 to the gear 47 is transmitted to the gear 50 via the integrally rotating gears 48 and 49. Further, the driving force passed to the gear 50 is transmitted to the input gear 5 so as to move the endless gear 3 in a predetermined direction.

Figure 14:
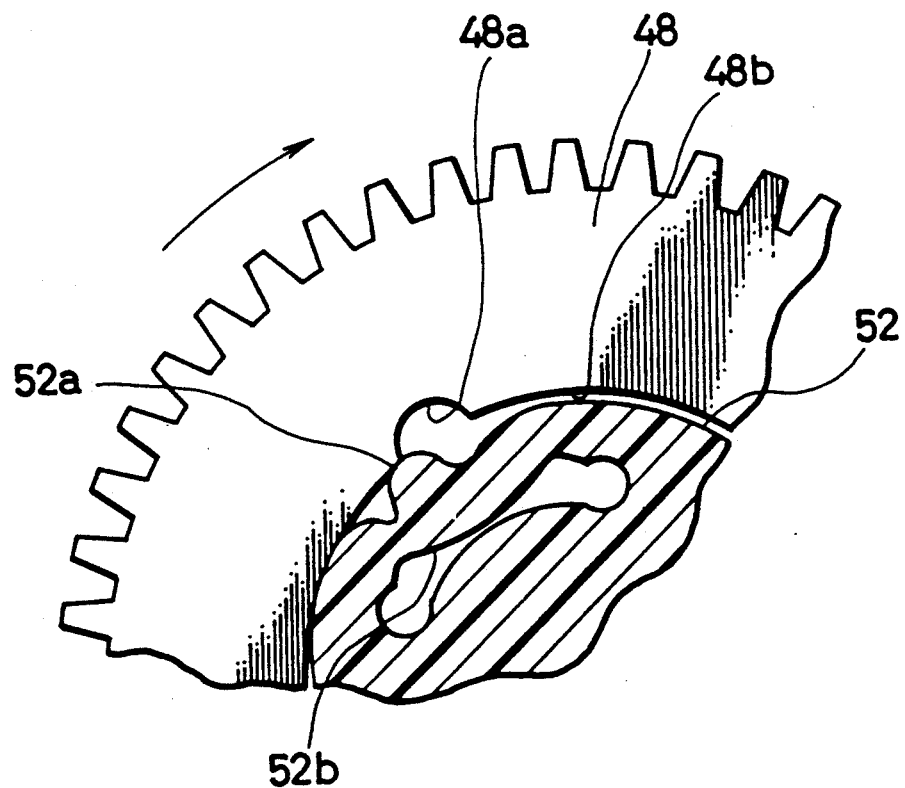
FIG. 14 is an explanatory view illustrating the overload release mechanism in an overloaded state.

On the other hand, when an external force preventing the movement of the endless gear 3 is applied, the gear 49 and the connector 52 are fixed. Since the gear 48 to which a driving force is transmitted tends to rotate, for example, clockwise as shown in FIG. 14, the protruding joint sections 52a are pressed by the internal walls of the recessed joint sections 48a, respectively.

When the pressure applied to the protruding joint sections 52a exceeds a predetermined value, portions in the vicinity of the protruding joint section 52a are deformed inwardly in the radial direction. This occurs because of the voids 52b formed between the protruding joint sections 52b and the axis.

Then, the recessed and protruding joint sections 48a and 52a are respectively disconnected, thereby allowing the rotation of the gear 48. In this case, a transmitting torque limit is set according to the elastic coefficient of the connector 52.

This configuration enables the elimination of the clutch, which is expensive and requires a predetermined control, from the driving force transmitting mechanism 54. Additionally, the overload release mechanism 51 of a simplified structure prevents the main motor 91, driving force transmitting mechanism 54, input gear 5, planetary gear 6 and endless gear 3 from getting damaged by overload.

With reference to FIGS. 16 through 21, the following will describe another embodiment of the present invention. For convenience' sake, the same reference numerals are given to members whose function are same as those of the members shown in the drawings of the above-mentioned embodiment, and therefore an explanation thereof will be omitted.

Figures 16, 17:
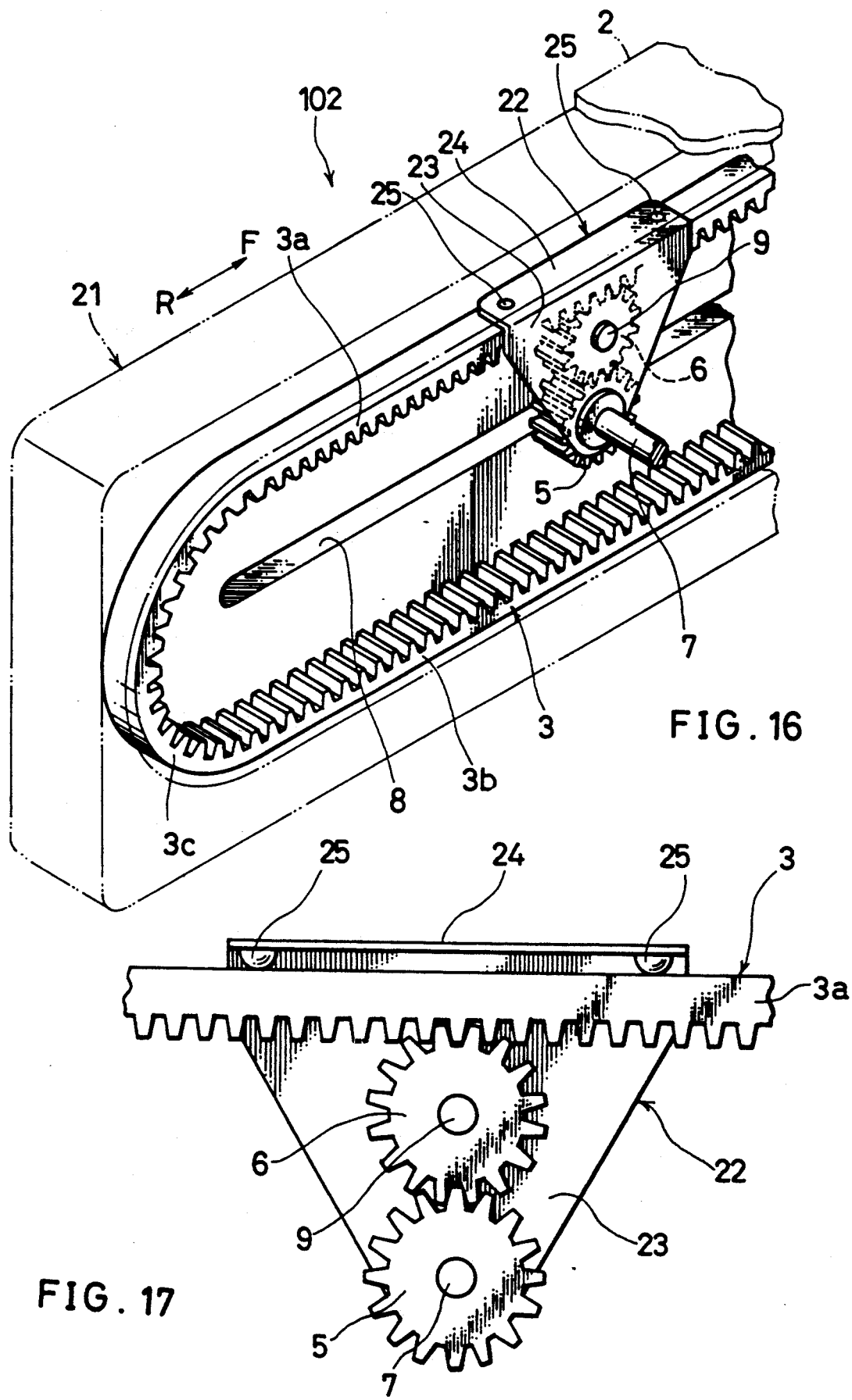
FIG. 16 is a perspective view illustrating essential parts of a driving device for a document platen according to another embodiment of the present invention.
FIG. 17 is a rear elevation illustrating the structure of the driving device's essential parts in the vicinity of a connecting plate.

As illustrated in FIG. 16, a driving device 102 for the document platen 2 of this embodiment includes a main carrier 21. The main carrier 21 has a connecting plate 22 whose function is similar to that of the connecting plate 11 shown in FIG. 1. However, it does not have the gear-shaft guiding groove 4 formed in the main carrier 1 of FIG. 1. The input shaft 7 of the input gear 5 is rotatably attached to the connecting plate 22, while the planetary gear 6 is rotatably supported by the gear shaft 9.

As illustrated in FIG. 17, the connecting plate 22 has a wall-like main section 23 to which the input shaft 7 and gear shaft 9 are connected, and a bent section 24. The bent section 24 is formed by bending an edge of the main section 23 at right angles, and faces the outer surface of the endless gear 3. The shape of the main section 23 is substantially triangular with the bent section 24 as the base. The input shaft 7 is connected to the vicinity of the top of the main section 23.

Figure 18:
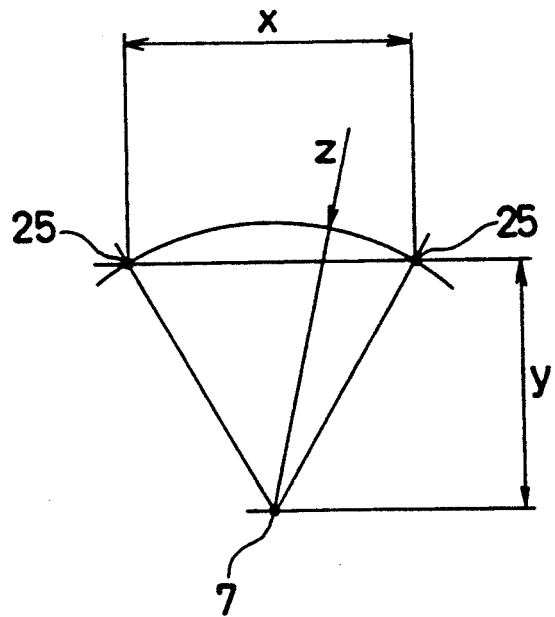
FIG. 18 is an explanatory view illustrating the positional relation between an input gear shaft and two sliding bodies of the driving device.

Meanwhile, a pair of sliding bodies 25 are mounted on both ends of the bent section 24. The sliding bodies 25 protrude from the bent section 24 and slide over the outer surface of the endless gear 3. As illustrated in FIG. 18, the sliding bodies 25 are positioned such that, when they are respectively connected to the input shaft 7 with imaginary straight lines, an isosceles triangle with the line between the sliding bodies 25 as the base is formed. Besides, in view of the stability of the connecting plate 22 during sliding, a distance x between the sliding bodies 25 should be as long as possible.

To conform to such a structure of the connecting plate 22, a distance z between the input shaft 7 and each of the outer surfaces of the left semicircular gear sections 3c and the right semicircular gear sections 3d is longer than a distance y between the input shaft 7 and each of the outer surfaces of the upper rack section 3a and the lower rack section 3b. The distance z is equal to a radius of a circle which has the input shaft 7 as center and passes through the sliding bodies 25.

Namely, when the distances z and y are equal to each other, the sliding bodies 25 can not slide over the outer surfaces of the left and right semicircular gear sections 3c and 3d properly as the outer surfaces of the semicircular gear sections 3c and 3d are curved. Therefore, by setting the distances as described above, a good sliding condition between the left and right semicircular gear sections 3c and 3d and the connecting plate 22 is ensured. This also enables a stabilized movement of the platen 2 shown in FIG. 16.

Similar to the driving device 101 for the platen 2 of FIG. 1, with this configuration, the platen 2 is reciprocated in the F direction and the R direction. This is due to the fact that the planetary gear 6 is held at a predetermined position through the connecting plate 22 and maintained in mesh with the endless gear 3 and the input gear 5 respectively.

More specifically, as for the movement of the platen 2, since the sliding bodies 25 and the input shaft 7 form an isosceles triangle as illustrated in FIG. 18 and the connecting plate 22 is slidably connected to the outer surface the endless gear 3 through the two sliding bodies 25, it is possible to prevent the connecting plate 22 from rotating around the input shaft 7 when the connecting plate 22 is slidably connected to the outer surfaces of the upper and lower rack sections 3a and 3b. This achieves a stable sliding condition between the endless gear 3 and the connecting plate 22.

Especially, when the left semicircular gear section 3c or the right semicircular gear section 3d of the endless gear 3 engages with the planetary gear 6, the connecting plate 22 slides over the arc-like outer surface of the endless gear 3 and is rotated by 180 degrees downward or upward. At this time, as shown in FIG. 18, the relation between the distance y and the distance z is z>y. Accordingly, it is possible for the respective sliding bodies 25 to slide over the outer surface of the right semicircular gear section 3d or the left semicircular gear section 3c.

Since this prevents one of the sliding bodies 25 from being detached from the right semicircular gear section 3d or the left semicircular gear section 3c, the connecting plate 22 is supported at three points by the input shaft 7 and the respective sliding bodies 25. Consequently, the connecting plate 22 is rotatably moved with stability.

Further, since the planetary gear 6 is supported by such a connecting plate 22, a stabilized supporting condition is achieved with respect to the planetary gear 6. Thus, the speed of moving the platen 2 in the F direction is stabilized, resulting in copied images of good quality.

Furthermore, as described above, since the planetary gear 6 is stably supported by the connecting plate 22, there is no need to provide the above-mentioned gearshaft guiding groove 4 of FIG. 1 on the main carrier 21. This enables a simplification of the structure of the main carrier 21.

Figure 19:
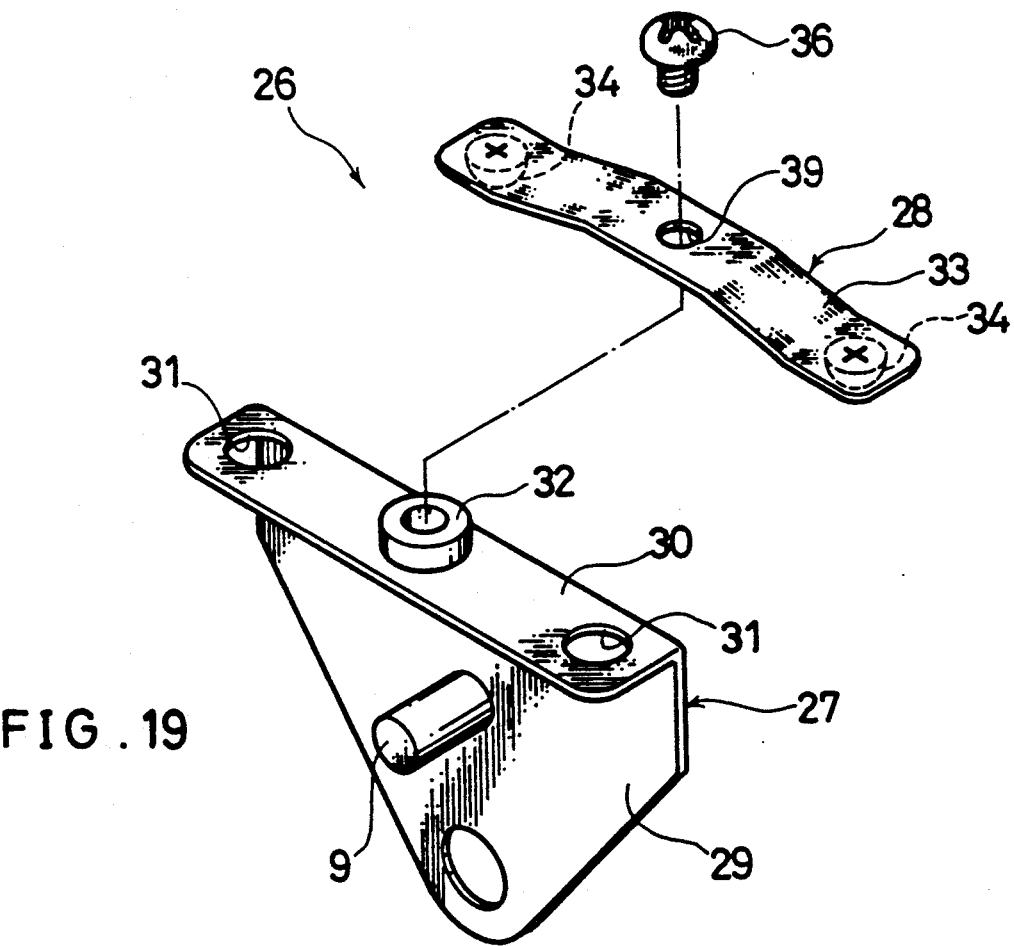
FIG. 19 is an exploded view perspectively illustrating another example of the connecting plate in the driving device.

In the driving device 102 for the platen 2 of this embodiment, the connecting plate 22 may be replaced with a connecting plate 26 shown in FIG. 19. The connecting plate 26 includes a main body 27 having a main section 29 and a bent section 30, and a sliding member 28. Formed at positions of the bent section 30 corresponding to sliding bodies 34 of a sliding member 28 are two holes 31 into which the sliding bodies 34 are to be inserted. And, a nut section 32 is formed at the center between the holes 31.

Meanwhile, the sliding member 28 has a hole 39 formed at the center of a curved supporting plate 33 for supporting the sliding bodies 34. The supporting plate 33 is made from a spring member, and the dome-like sliding bodies 34 are mounted on both ends of the bottom surface of the supporting plate 33. The sliding member 28 is fixed to the nut section 32 of the bent section 30 with a screw 36 while the sliding bodies 34 protrude from the holes 31.

In the connecting plate 26, since the sliding bodies 34 are supported by the supporting plate 33 made from the spring member, even when the distance between the input shaft 7 and the outer surface of the endless gear 3 is set without accuracy, changes in the distance are compensated. Thus, the sliding stability of the sliding bodies 34 against the outer surface of the endless gear 3 is improved. This also enables a further improvement in the stability of the moving speed of the platen 2.

Figure 20:
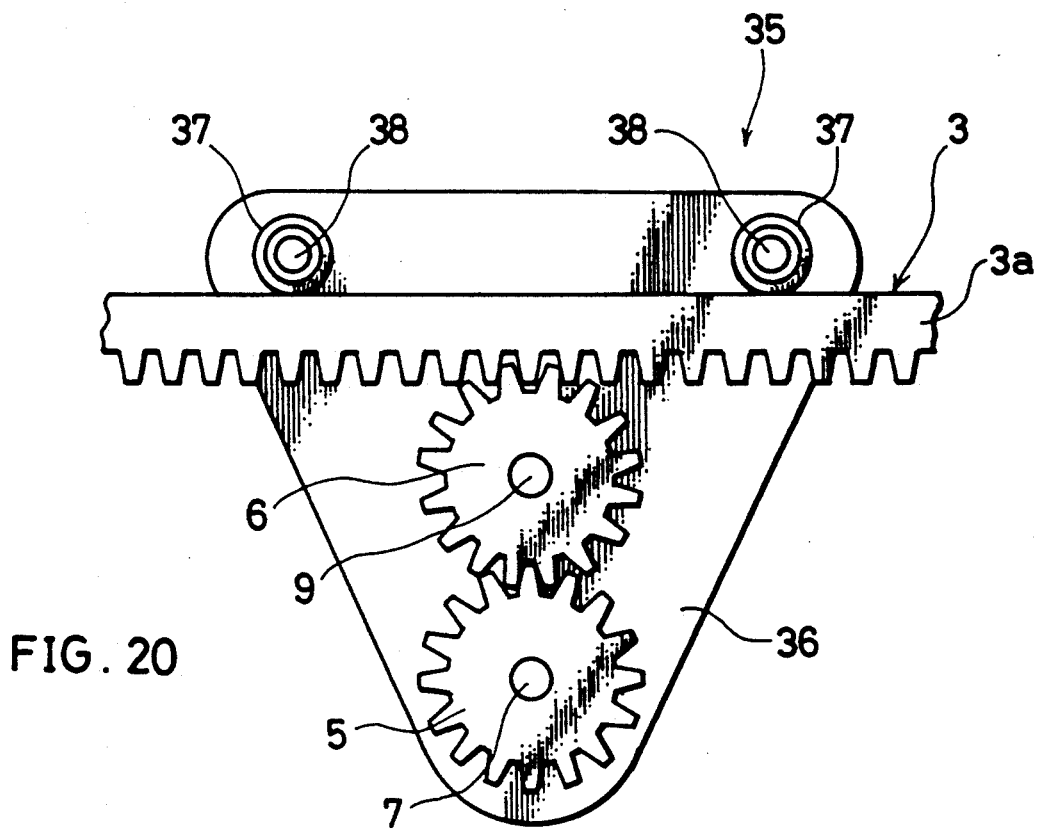
FIG. 20 illustrates still another example of the connecting plate in the driving device, and more particularly is a rear elevation of essential parts thereof in the vicinity of the connecting plate.
Figure 21:
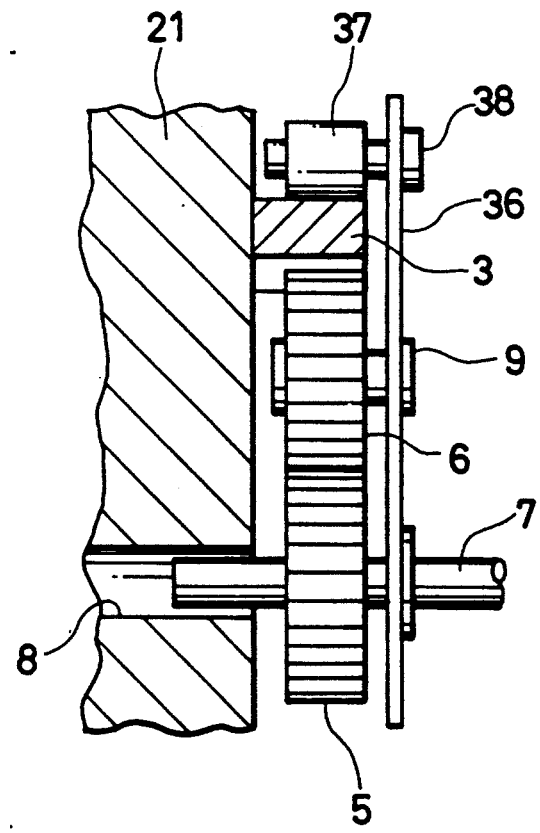
FIG. 21 is a side elevation illustrating the structure in the vicinity of the connecting plate.

As for the sliding bodies 25 mounted on the connecting plate 22 shown in FIG. 17, rollers, semi-spherical bodies or sliding members are preferably used in view of the abrasion resistance and the stability during sliding. For example, in the case of using rollers, a connecting plate 35 is used as the connecting plate 22 as illustrated in FIGS. 20 and 21. The connecting plate 35 has a plate-like main body 36 substantially in the shape of an isosceles triangle. A pair of rollers 37 rolling on the outer surface of the endless gear 3 is installed on the connecting plate 35. The rollers 37 are respectively attached to corners of the main body 36 with roller shafts 38.

The incorporation of the connecting plate 35 achieves a further improvement in the moving speed of the platen 2. And, this enables copying with less blurred images, thereby improving the quality of the copied images.

Still another embodiment of the present invention will be described below with reference to FIG. 22. For convenience' sake, the same reference numerals are given to members whose functions are same as those of the members shown in the drawings of the above-mentioned embodiments, and thereby omitting an explanation thereof.

Figure 22:
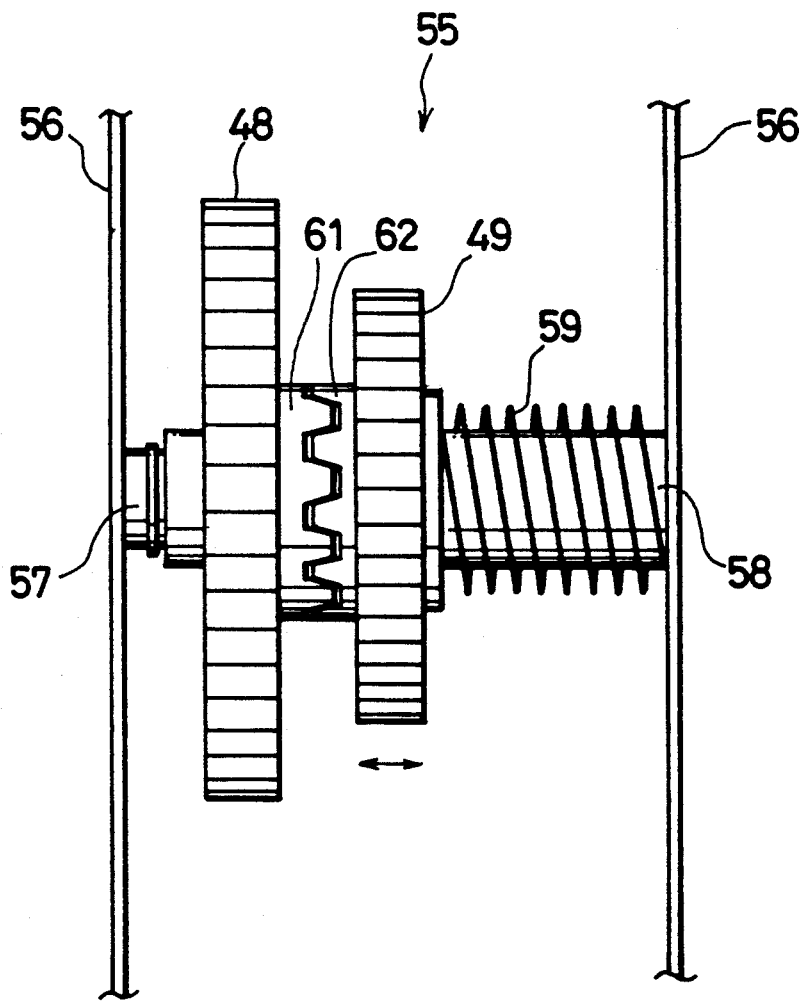
FIG. 22 relates to another embodiment of the driving device of the present invention, and is a side elevation of the overload release mechanism.

In a driving device for a document platen of this embodiment incorporates an overload release mechanism 55 shown in FIG. 22 instead of the overload release mechanism 51 shown in FIG. 12. The overload release mechanism 55 is constituted by a spring 59 and intermeshing sections 61 and 62. The gear 48 is attached to the rotation shaft 57, while the gear 49 is attached to the rotation shaft 58 so as to be freely movable forward and backward along the axis direction.

The rotation shafts 57 and 58 are disposed coaxially between gear supporting plates 56 which are disposed on the facing positions. The gear 49 is pushed toward the gear 48 by the spring 59. The intermeshing sections 61 and 62 that mesh with each other are formed on the side faces of the gears 48 and 49 which face each other. Since the intermeshing sections 61 and 62 come into mesh, the gears 48 and 49 rotate integrally.

For example, when an external force which prevents the movement of the platen 2 is applied and prevents the rotation of the gear 48, the intermeshing sections 61 and 62 move the gear 49 against the pushing force of the spring 59 by the torque transmitted to the gear 48.

Therefore, even when the gear 49 is locked, the gear 48 can rotate as the intermeshing sections 61 and 62 are disconnected.

In this case, the transmitting torque limit is set according to the elastic coefficient of the spring 59. In consequence, similar to the overload release mechanism 51 shown in FIGS. 12 and 13, the overlord release mechanism 55 of a simple structure prevents the main motor 91, drive transmitting mechanism 54, input gear 5, planetary gear 6 and endless gear 3 from being damaged by overload.

The following will explain another embodiment of the present invention with reference to FIG. 23 through FIG. 26. For convenience' sake, the same reference numerals are given to members whose functions are same as those of the members shown in the drawings of the above-mentioned embodiments, and thereby omitting an explanation thereof.

Figure 23:
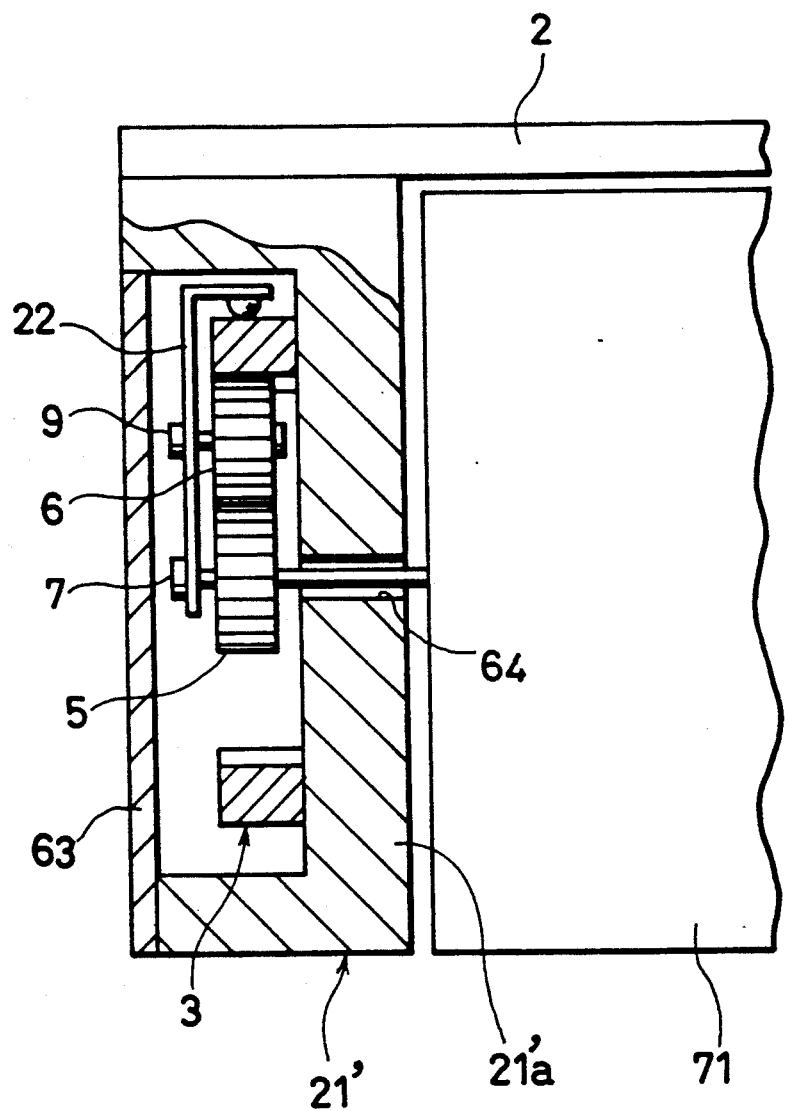
FIG. 23 relates to still another embodiment of the driving device of the present invention, and is a fragmentary sectional view schematically illustrating the position of a main carrier with respect to the main body of a copying machine.
Figure 24:
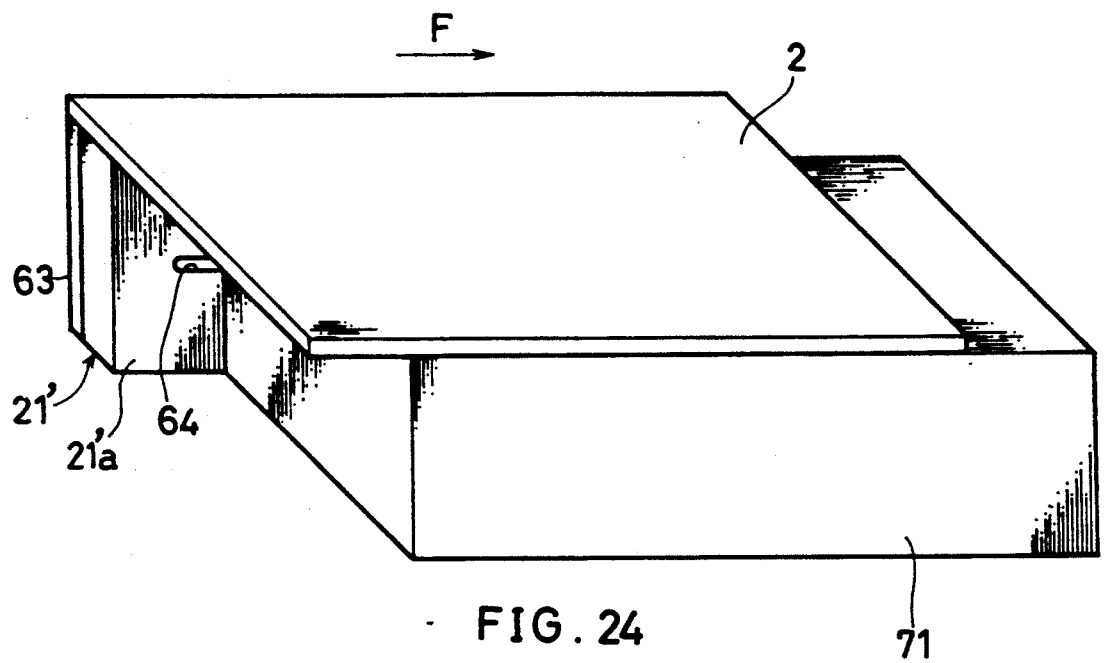
FIG. 24 is a perspective view illustrating the main body and the main carrier of the copying machine.

As illustrated in FIGS. 23 and 24, a driving device for a document platen of a copying machine of this embodiment includes a main carrier 21'. The main carrier 21' is located under the platen 2 which is mounted on the upper surface of a main body 71 of the copying machine. The main carrier 21' is installed such that a side thereof on which the endless gear 3 is mounted faces outward and its smooth reverse side faces the back side of the main body 71. Namely, the longitudinal wall section 21'a of the main carrier 21' faces the back side of the main body 71.

The main carrier 21' has a covering plate 63 for covering the side thereof whereon the endless gear 3 is mounted. Additionally, the input shaft 7 of the input gear 5 passes through the longitudinal wall section 21'a. Therefore, the longitudinal wall section 21'a has, instead of the input shaft guiding groove 8 of FIG. 1, a hole 64 through which the input shaft 7 is inserted into the inside of the main body 71 and is connected to the drive transmitting mechanism 54 shown in FIG. 11.

Figure 25:
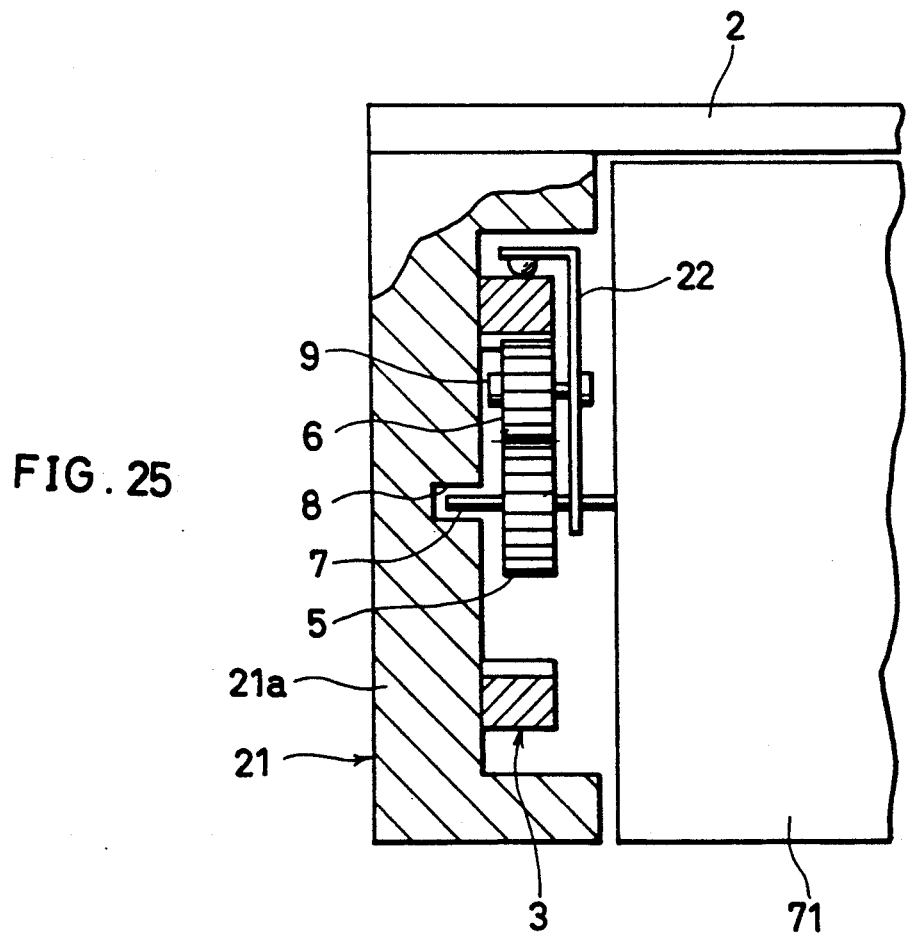
FIG. 25 is a fragmentary sectional view illustrating the positional relation between the main body of the copying machine and the main carrier of FIG. 16 installed in the copying machine.
Figure 26:
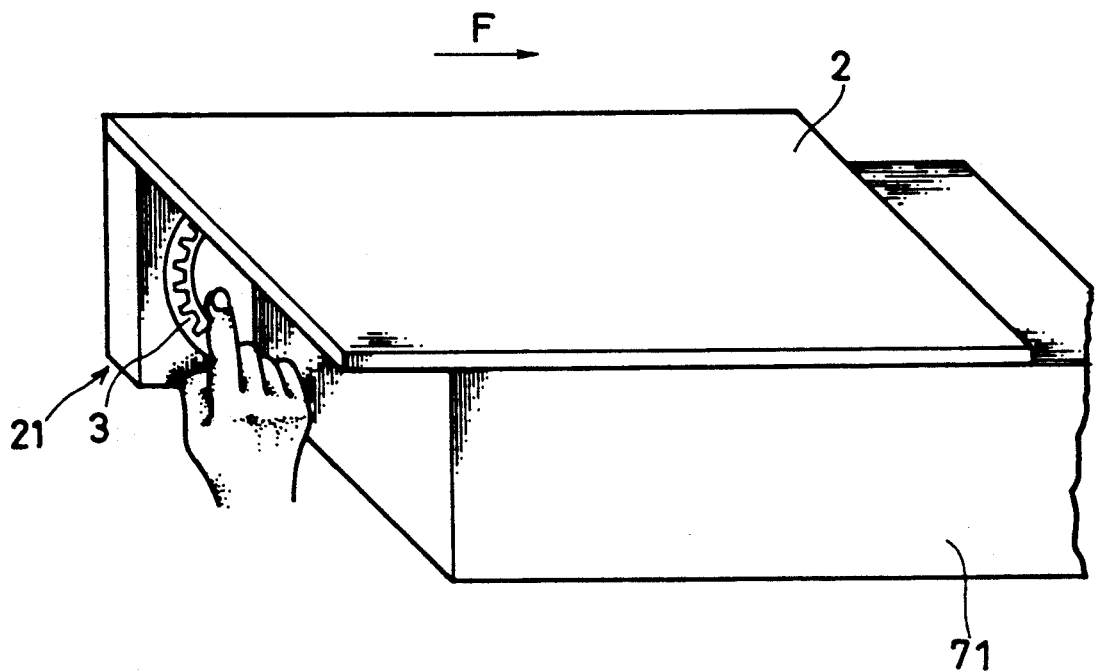
FIG. 26 is a perspective view illustrating a finger nipped between the main carrier and the main body.
Figure 27:
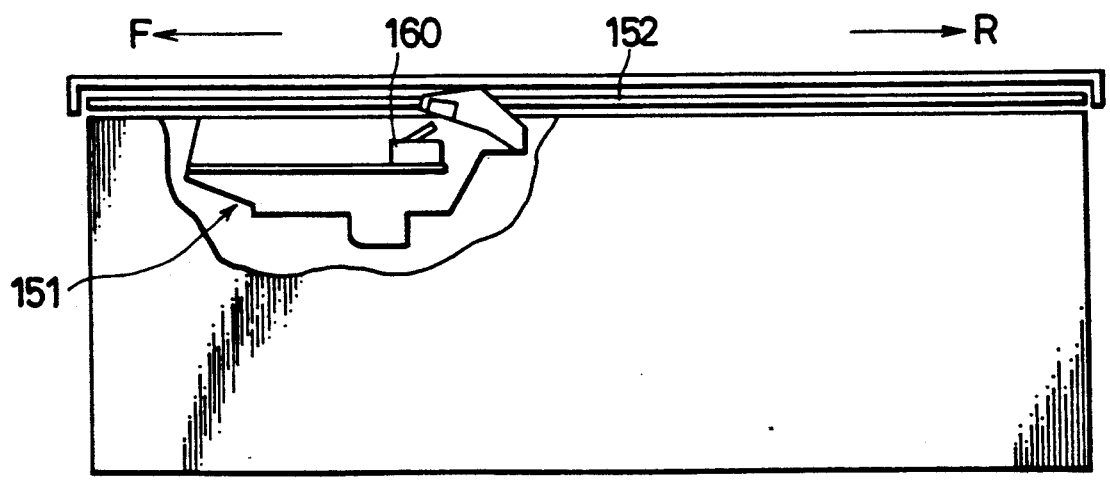
FIG. 27 is a break front elevation of essential parts of a conventional copying machine incorporating a driving device for a document platen.
Figure 28:
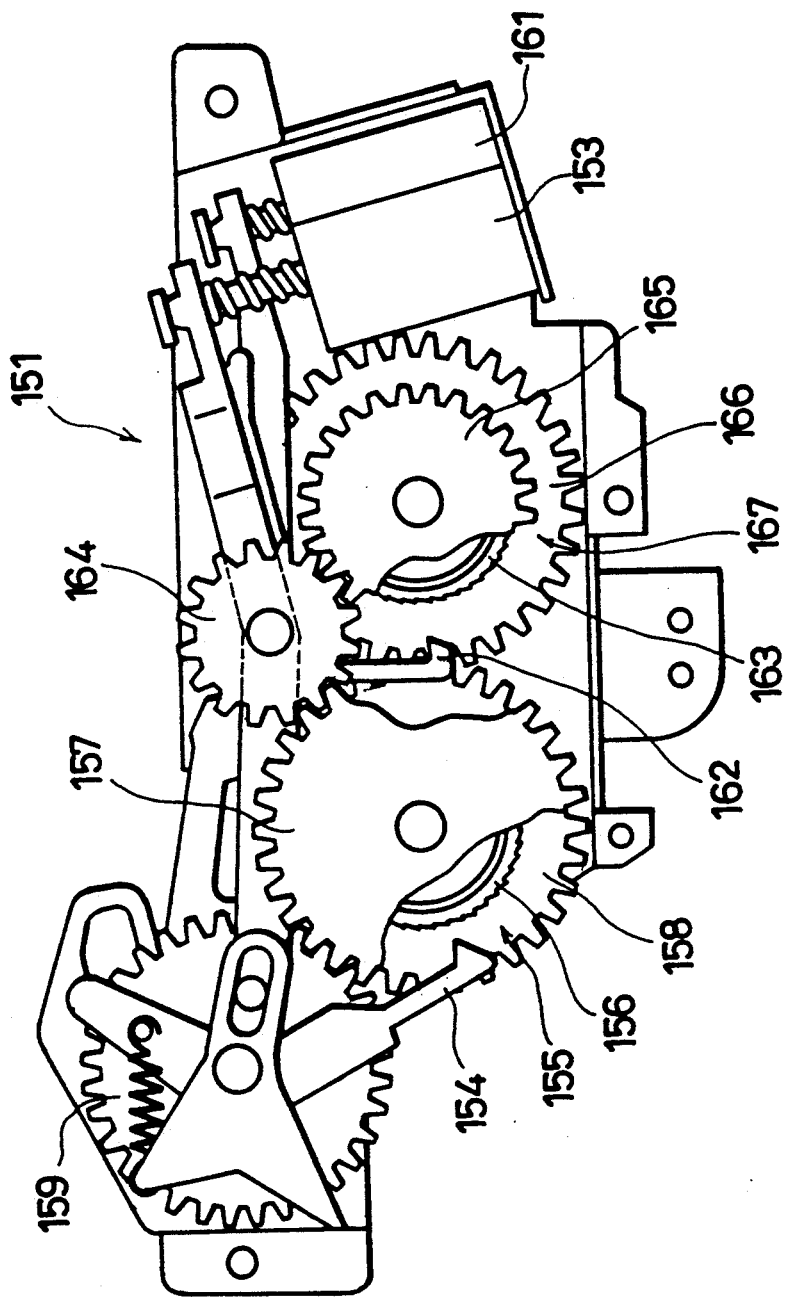
FIG. 28 is a front elevation of essential parts of a driving force transmitting mechanism in the driving device.

This configuration prevents injury, for example, a service person's finger from being nipped between the moving main carrier 21' and the main body 71 of the copying machine. More particularly, in the case of the driving device 102 shown in FIG. 16, the main carrier 21' is disposed such that a side thereof on which the endless gear 3 is attached faces the main body 71 as shown in FIG. 25. With this configuration, if, for example, the platen 2 is driven when a service person's finger is inserted toward the endless gear 3 for repairing the copying machine, the finger will be nipped between the teeth of the endless .gear 3 and a corner of the main body 71 as shown in FIG. 26.

However, with the driving device shown in FIGS. 23 and 24, since the longitudinal wall section 21'a of the main carrier 21' faces the main body 71, it is possible to prevent a finger from being nipped between the teeth of the endless gear 3 and the corner of the main body 71. Moreover, with this configuration, if the covering plate 63 is designed to be detachable, the endless gear 3 is easily exposed, and which makes the checking and repairing of the respective members including the endless gear 3 easier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving device for a document platen, comprising:
    a document platen on which a document is placed;
    driving means for producing a driving force;
    an input gear, located in a fixed position, to which the driving force is transmitted;
    a planetary gear which meshes with and moves around said input gear; and
    an endless gear in the form of a closed loop, wherein said endless gear is connected to said document platen and has internal teeth which mesh with said planetary gear such that a reciprocating movement of said document platen is caused by a circular movement of said planetary gear around said input gear, and
    wherein the teeth of said input gear face the teeth of said planetary gear.

2. The driving device according to claim 1, further comprising a connecting plate attached rotatably to said input gear and said planetary gear.

3. The driving device according to claim 2, wherein said endless gear has a sliding surface formed around the outer circumference thereof, and said connecting plate has a sliding section which slides over the sliding surface.

4. The driving device according to claim 1, wherein said endless gear includes two rack sections, and two semicircular gear sections for connecting the ends of said one rack section with those of said other rack section, a pitch line of said internal teeth at said one rack section being parallel with a pitch line of said internal teeth at said other rack section, said internal teeth being aligned in an arc at said semicircular gear sections.

5. The driving device according to claim 4, further comprising a substantially rectangular parallelopiped carrier, and a main body of a copying machine for supporting said document platen movably in a first direction, said carrier having a first side for carrying said endless gear and a second side opposite to the first side, wherein said carrier is positioned such that the second side faces a side of said main body which is parallel with the first direction.

6. The driving device according to claim 5, wherein said carrier is installed such that it is vertically suspended from an edge of said document platen, the edge being parallel with the first direction.

7. A driving device for a document platen, comprising:
    a reciprocating document platen on which a document is placed;
    driving means for producing a driving force;
    an input gear located in a fixed position for transmitting the driving force;
    a planetary gear which meshes with and moves around said input gear;
    a connecting plate attached rotatably to said input gear and said planetary gear; and
    an endless gear, connected to said document platen, and having internal teeth, for converting a rotation of said input gear into a reciprocating movement of said document platen through said planetary gear, the teeth of said input gear facing the teeth of said planetary gear,
    wherein said connecting plate is positioned so as to maintain said planetary gear and said input gear and endless gear in mesh, and wherein said endless gear includes two rack sections, and two semicircular gear sections for connecting the ends of one of said two rack sections with those of said other rack section, a pitch line of said internal teeth at said one rack section being parallel with a pitch line of said internal teeth at said other rack sections, said internal teeth being aligned in an arc at said semicircular gear sections.

8. The driving device according to claim 7, wherein a sliding surface is formed around the outer circumference of said endless gear, and said connecting plate has a sliding section on an edge thereof, said sliding section sliding over said sliding surface.

9. The driving device to claim 7, wherein said endless gear has a smooth surface formed around the outer circumference thereof, and said connecting plate has a rolling section which moves on the smooth surface when said endless gear moves.

10. The driving device according to claim 9, wherein said rolling section includes a pair of rolling bodies, said rolling bodies being disposed such that the axes of said rolling bodies are perpendicular to a moving direction of said endless gear and that, when said rolling bodies and a shaft of said input gear are connected to each other with imaginary straight lines, an isosceles triangle with an imagining line between said rolling bodies as base is formed.

11. The driving device according to claim 10, wherein said rolling bodies are in the shape of rolls.

12. A copying machine comprising:
    a movable document platen on which a document is placed;
    a driving device for reciprocating said document platen;
    transport means for transporting copy paper on which an image is to be copied when said document platen is moved; and
    driving means for driving both said driving device and said transport means,
    wherein a transport distance of the copy paper is set according to a travel distance of said document platen such that said transport means transports the copy paper having a copied image thereon to be fed out of said copying machine before said document platen which has been moved to scan the document returns to a predetermined original position;
    wherein said driving device comprises:
    a second driving means for producing a driving force;
    an input gear, located in a fixed position, to which the driving force if transmitted;

a planetary gear which meshes with and moves around said input gear; and an endless gear in the form of a closed loop, wherein said endless gear is connected to said document platen and has internal teeth which mesh with said planetary gear such that a reciprocating movement of said document platen is caused by a circular movement of said planetary gear around said input gear.

13. A copying machine according to claim 12, wherein said driving device comprises:

driving means for producing a driving force;

an input gear located in a fixed position for transmitting the driving force;

a planetary gear which meshes with and moves around said input gear;

a connecting plate attached rotatably to said input gear and said planetary gear; and an endless gear, connected to said document platen, for converting a rotation of said input gear into a reciprocating movement of said document platen through said planetary gear, wherein connecting plate is disposed such that said planetary gear and said input gear and endless gear are maintained in mesh, and wherein said endless gear includes two rack sections and two semicircular gear sections for connecting the ends of one of said two rack sections with those of said other rack section, a pitch line of said internal teeth at said one rack section being parallel with a pitch line of said internal teeth at said other rack section, said internal teeth being aligned in an arc at said semicircular gear sections.

14. A copying machine according to claim 13, wherein said endless gear has a sliding surface formed around the outer circumference thereof, and said connecting plate has a sliding section formed on an edge thereof, said sliding section sliding over the sliding surface.

15. A copying machine according to claim 14, wherein said sliding section includes a pair of sliding bodies aligned along a moving direction of said endless gear, said sliding bodies being disposed such that, when said sliding bodies and a shaft of said input gear are connected to each other with imaginary straight lines, an isosceles triangle with the imaginary line between the sliding bodies as base is formed.

16. A copying machine, comprising:

driving means for producing a driving force;

a movable document platen on which a document is placed;

a main body on which said document platen is installed; and a driving device for reciprocating said document platen on said main body, wherein said driving device includes;

an input gear to which the driving force is transmitted, said input gear being located in a fixed position such that the rotating axis of said input gear is substantially parallel with said document platen;

a planetary gear which meshes with and moves around said input gear; and an endless gear having internal teeth which mesh with said planetary gear, wherein said endless gear is in the form of a closed loop, located on and connected to a side of said document platen, and wherein a circular movement of said planetary gear around said input gear causes a reciprocating movement of said document platen.

17. A copying machine, comprising:

driving means for producing a driving force;

a movable document platen on which a document is placed;

a driving force transmitting mechanism for transmitting the driving force to said document platen; and an overload release mechanism for suspending the supplying of the driving force to said document platen by using an overload which prevents a movement of said document platen.

18. The copying machine according to claim 17, wherein said overload release mechanism comprises:

a first gear for receiving the driving force;

a second gear for transmitting the driving force to said input gear, said first and second gears being disposed so as to face each other;

a first intermeshing section mounted on said first gear; and a second intermeshing section mounted on said second gear, said second intermeshing section being designed to engage with said first intermeshing section and to disengage from said first section by the overload.

19. The driving device according to claim 18, wherein said second intermeshing section includes a connecting body which is elastically deformed when the overload is applied to said second intermeshing section.

20. The driving device according to claim 19, wherein said second intermeshing section further includes a void within said connecting body.

21. The driving device according to claim 18, wherein said overload release mechanism further includes means for pushing said second intermeshing section toward said first intermeshing section so as to mesh with the said first intermeshing section and for moving said second intermeshing section forward and backward by using the overload applied to said second intermeshing section.

22. A driving device for a document platen, comprising:

a reciprocating document platen on which a document is placed;

driving means for producing a driving force;

an input gear, located in a fixed position, for transmitting the driving force;

a planetary gear which meshes with and moves around said input gear;

a connecting plate for rotatably supporting said input gear and said planetary gear; and an endless gear, connected to said document platen and having internal teeth, for converting a rotation of said input gear into a reciprocating movement of said document platen through said planetary gear, wherein said endless gear includes two rack sections, two semicircular gear sections for connecting the ends of one of said two rack sections with those of said other rack section, a sliding surface being formed around the outer circumference thereof, a pitch line of said internal teeth at said one rack section being parallel with a pitch line of said internal teeth at said other rack section, said internal teeth being aligned in an arc at said semicircular gear sections, wherein said connecting plate has a sliding section on an edge thereof and is positioned so as to maintain said planetary gear and said input gear and endless gear are in mesh, said sliding section sliding over said sliding surface, wherein said sliding section includes a pair of sliding bodies aligned along a moving direction of said endless gear, said sliding bodies being disposed such that, when said sliding bodies and a shaft of said input gear are connected to each other with imaginary straight lines, an isosceles triangle with the imaginary line between said sliding bodies a base is formed.

23. The driving device according to claim 22, wherein each of said sliding bodies is substantially semispherical.

24. The driving device according to claim 22, wherein said sliding section further including means for pushing said sliding bodies toward said sliding surface.

25. A driving device for a document platen, comprising:

a reciprocating document platen on which a document is placed;

driving means for producing a driving force;

an input gear, located in a fixed position, for transmitting the driving force;

a planetary gear which meshes with and moves around said input gear;

a connecting plate for rotatably supporting said input gear and said planetary gear;

an endless gear, connected to said document platen, for converting a rotation of said input gear into a reciprocating movement of said document platen through said planetary gear; and a driving force transmitting mechanism for transmitting the driving force of said input gear to said document platen, said driving force transmitting mechanism including an overload release mechanism for suspending the supplying of the driving force to said document platen by using an overload which prevents a movement of said document platen.

26. The driving device according to claim 25, wherein said overload release mechanism comprises:

a first gear for receiving the driving force;

a second gear for transmitting the driving force to said input gear, said first and second gears being disposed such that they face each other;

a first intermeshing section mounted on said first gear; and a second intermeshing section mounted on said second gear, said second intermeshing section being designed to engage with said first intermeshing section, and to disengage from said first section by the overload.

27. The driving device according to claim 26, wherein said second intermeshing section includes a connecting body which is elastically deformed when the overload is applied to said second intermeshing section.

28. The driving device according to claim 27, wherein said second intermeshing section further includes a void within said connecting body.

29. The driving device according to claim 26, wherein said overload release mechanism further includes means for pushing said second intermeshing section toward said first intermeshing section so as to mesh with the said first intermeshing section and for moving said second intermeshing section forward and backward by using the overload applied to said second intermeshing section.

* * * * *